(12) United States Patent
Shao

(10) Patent No.: US 12,488,111 B2
(45) Date of Patent: Dec. 2, 2025

(54) COMPUTER SYSTEM, TRUSTED FUNCTION COMPONENT, AND RUNNING METHOD

(71) Applicant: Huawei Technologies Co., Ltd., Shenzhen (CN)

(72) Inventor: Meng Shao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 18/344,240

(22) Filed: Jun. 29, 2023

(65) Prior Publication Data

US 2023/0342472 A1    Oct. 26, 2023

Related U.S. Application Data

(63) Continuation of application No. PCT/CN2021/140990, filed on Dec. 23, 2021.

(30) Foreign Application Priority Data

Dec. 29, 2020    (CN) .......................... 202011586588.5

(51) Int. Cl.
*G06F 21/57*    (2013.01)

(52) U.S. Cl.
CPC .......... *G06F 21/572* (2013.01); *G06F 21/575* (2013.01); *G06F 2221/034* (2013.01)

(58) Field of Classification Search
CPC ........ G06F 21/53; G06F 21/57; G06F 21/572; G06F 21/575; G06F 21/74; G06F 2221/034
See application file for complete search history.

(56) References Cited

U.S. PATENT DOCUMENTS

| | | | |
|---|---|---|---|
| 9,335,986 B1* | 5/2016 | Bowen | G06F 8/656 |
| 10,534,620 B2 | 1/2020 | Samuel et al. | |
| 10,896,266 B1* | 1/2021 | BeSerra | H04L 63/062 |
| 11,531,760 B1* | 12/2022 | Righi | G06F 21/85 |

(Continued)

FOREIGN PATENT DOCUMENTS

| | | |
|---|---|---|
| CN | 105160255 A | 12/2015 |
| CN | 106874771 A | 6/2017 |

(Continued)

OTHER PUBLICATIONS

Zhang, Jian-biao et al. CN 111158767 A (machine translation), published May 15, 2020. (Year: 2020).*

(Continued)

*Primary Examiner* — Michael Simitoski
(74) *Attorney, Agent, or Firm* — Conley Rose, P.C.

(57) ABSTRACT

A computer system includes a computing component and a trusted function component. The trusted function component includes an out-of-band management chip. The out-of-band management chip is configured to construct a root of trust in the out-of-band management chip by running secure firmware, perform trusted measurement on the computing component based on the root of trust, and control the computing component based on a trusted measurement result. The computing component is configured to perform, based on control of the out-of-band management chip, an operation indicated by the control of the out-of-band management chip.

20 Claims, 6 Drawing Sheets

(56) References Cited

U.S. PATENT DOCUMENTS

| | | | |
|---|---|---|---|
| 2004/0172542 A1* | 9/2004 | Minemura | G07F 7/1008 |
| | | | 713/181 |
| 2017/0220802 A1* | 8/2017 | Huang | G06F 9/4401 |
| 2018/0025150 A1* | 1/2018 | Shivanna | G06F 21/6218 |
| | | | 713/2 |
| 2018/0088962 A1* | 3/2018 | Balakrishnan | G06F 11/0757 |
| 2018/0096151 A1* | 4/2018 | Ghetie | G06F 21/575 |
| 2019/0163497 A1 | 5/2019 | Samuel et al. | |
| 2020/0293661 A1* | 9/2020 | Liu | H04L 9/0894 |
| 2020/0344265 A1* | 10/2020 | Kelly | H04L 63/0823 |
| 2021/0011734 A1* | 1/2021 | Dang | H04L 9/088 |
| 2022/0067165 A1* | 3/2022 | Huang | G06F 11/3024 |
| 2024/0028738 A1* | 1/2024 | Wang | G06F 21/572 |

FOREIGN PATENT DOCUMENTS

| | | | | |
|---|---|---|---|---|
| CN | 107506663 A | | 12/2017 | |
| CN | 109740353 A | * | 5/2019 | |
| CN | 111008379 A | * | 4/2020 | G06F 21/57 |
| CN | 111158767 A | * | 5/2020 | G06F 21/52 |
| CN | 111723376 A | * | 9/2020 | G06F 21/572 |
| CN | 112114908 A | | 12/2020 | |
| CN | 114692160 A | * | 7/2022 | |
| TW | 202113616 A | * | 4/2021 | |

OTHER PUBLICATIONS

Yang, Tao. CN 111008379 A (machine translation), published Apr. 14, 2020. (Year: 2020).*

Qiu, Lian-xing. CN 111723376 A (machine translation), published Sep. 29, 2020. (Year: 2020).*

Shao, Meng et al. CN 114692160 A (machine translation), published Jul. 1, 2022. (Year: 2022).*

Sun, Pei-Chieh et al. TW 202113616 A (machine translation), published Apr. 1, 2021. (Year: 2021).*

Yao, Jiewen, and Vincent Zimmer. "Building secure firmware." Apress: New York, NY, USA (2020): 197-255. (Year: 2020).*

Zhang, Jian-biao et al. CN 109740353 A (machine translation), published May 10, 2019. (Year: 2019).*

* cited by examiner

COMPUTER SYSTEM, TRUSTED FUNCTION COMPONENT, AND RUNNING METHOD

CROSS-REFERENCE TO RELATED APPLICATIONS

This application is a continuation of International Patent Application No. PCT/CN2021/140990 filed on Dec. 23, 2021, which claims priority to Chinese Patent Application No. 202011586588.5 filed on Dec. 29, 2020. The disclosures of the aforementioned applications are hereby incorporated by reference in their entireties.

TECHNICAL FIELD

The present disclosure relates to the field of trusted computing technologies, and in particular, to a computer system, a trusted function component, and a running method.

BACKGROUND

If a computer lacks a security mechanism for protecting computer security, the entire computer is vulnerable attack, and consequently the computer runs in an uncontrollable state. Therefore, security measures need to be taken on the computer to improve computing security.

At present, a trusted computing technology is usually used for protecting computer security. In the trusted computing technology, a cryptographic algorithm may be implanted into a computer, and a trusted measurement mechanism is added in each execution phase of a computer running process by using the cryptographic algorithm, so as to ensure computer security.

However, currently, security of performing trusted measurement on the computer is relatively poor.

SUMMARY

The present disclosure provides a computer system, a trusted function component, and a running method, so as to ensure security of performing trusted measurement and control on a computing component and a trusted function component based on a root of trust. The technical solutions provided in the present application are as follows:

According to a first aspect, the present application provides a computer system. The computer system includes a computing component and a trusted function component. The trusted function component includes an out-of-band management chip. The out-of-band management chip is configured to construct a root of trust in the out-of-band management chip by running secure firmware, perform trusted measurement on the computing component based on the root of trust, and control the computing component based on a trusted measurement result. The computing component is configured to perform, based on control of the out-of-band management chip, an operation indicated by the control.

In the computer system provided in the present application, the root of trust is constructed in the out-of-band management chip. Because the out-of-band management chip has a feature of more secure hardware, security of the constructed root of trust can be ensured. In addition, trusted measurement and control are performed on the computing component and the trusted function component based on the root of trust, so that security of trusted measurement and control can be ensured.

The out-of-band management chip has a security core, and the security core is further configured to construct the root of trust in the security core by running the secure firmware. Because the security core implements physical isolation, the physical isolation can ensure security in the security core. Therefore, a process of constructing the root of trust by using the security core can further ensure security of the constructed root of trust.

In a possible implementation, a core root of trust for measurement (CRTM) configured to construct the root of trust is stored in a read-only memory of the out-of-band management chip. Because the CRTM is stored in the read-only memory, the read-only memory can be accessed only by the security core, and a read operation can be performed only on the read-only memory, rather than a write operation. When executable code stored in the read-only memory needs to be maliciously tampered with, because the read-only memory does not support re-writing, malicious tampering of the executable code stored in the read-only memory can be prevented, and security of the CRTM stored in the read-only memory can be ensured, the security of the root of trust constructed based on the CRTM can be further ensured.

In a possible implementation, the secure firmware includes further configured to perform trusted measurement on the computing component, and control the computing component based on a trusted measurement result on the computing component.

In this case, the secure firmware is used to perform trusted measurement and control on at least one to-be-measured object in the computing component. Compared with a trusted measurement and control process of the to-be-measured object in the computing component in the related technology, a measurement subject can be concentrated on the secure firmware as much as possible, so that the to-be-measured object can be as close to the root of trust as possible, and a problem that identities of the measurement subject and the to-be-measured object are confused and a boundary between a trusted domain and an untrusted domain is blurred caused by a reason that the measurement subject in the computing component is also a to-be-measured object can be solved, this can further ensure security of the computing component.

In addition, the secure firmware is further configured to perform trusted measurement on at least two to-be-measured objects in the computing component, and control any one of the at least two to-be-measured objects based on a trusted measurement result of the any to-be-measured object.

In addition, when the secure firmware is used to perform trusted measurement on the at least two to-be-measured objects in the computing component, trusted measurement and control process of the at least two to-be-measured objects can be independent of each other. A chain-based chain of trust in a related technology is changed to a centralized trusted topology structure centered on the secure firmware, so that a case in which an entire chain of trust is broken because a to-be-measured object in the computing component is attacked or tampered with can be avoided.

The computing component includes a plurality of to-be-measured objects. For example, the to-be-measured object in the computing component includes an image file of a basic input/output apparatus, an image file of a first operating system kernel, an image file of a first operating system boot layer, and an image file of a business application.

In addition, the to-be-measured object in the computing component further includes a configuration file of a complex programmable logic device. Trusted measurement is performed on the complex programmable logic device, so that security of enabling and running of the complex programmable logic device can be ensures.

The secure firmware includes a secure firmware enable layer, a secure firmware boot layer, and a secure firmware function layer. In order to further improve security of the computer, trusted measurement and trusted control may also be performed on the trusted function component, and an implementation of trusted measurement and control includes:

The out-of-band management chip is further configured to run the secure firmware enable layer, and construct the root of trust in the out-of-band management chip. The secure firmware enable layer is further configured to perform trusted measurement on the secure firmware boot layer based on the root of trust, and control the secure firmware boot layer based on a measurement result of the secure firmware boot layer. The secure firmware boot layer is configured to perform trusted measurement on the secure firmware function layer based on the root of trust, and control the secure firmware function layer based on a measurement result of the secure firmware function layer. The secure firmware function layer is configured to perform trusted measurement on a to-be-measured object, and control the another to-be-measured object based on a trusted measurement result of the another to-be-measured object. The another to-be-measured object includes a to-be-measured object other than the secure firmware in the computer system.

In a possible implementation, the out-of-band management chip has the security core, and the security core is further configured to run the secure firmware. For example, the secure firmware enable layer, the secure firmware boot layer, and the secure firmware function layer are all run by the security core, to further ensure security of the secure firmware enable layer, the secure firmware boot layer, and the secure firmware function layer.

The security core runs the secure firmware, so that a physical isolation advantage of the security core can be used, and a component running in a performance domain environment does not have a basis for performing an unauthorized operation on a security domain, thereby implementing isolation protection on the secure firmware, and ensuring better security of the computer.

In a possible implementation, the out-of-band management chip has a performance core, and the performance core is configured to run a second operating system of the computer. For example, the trusted function component further includes a second operating system boot layer, a second operating system kernel layer, and a trusted application layer. The performance core is configured to run the second operating system boot layer, the second operating system kernel layer, and the trusted application layer.

To further improve the security of the computer, an implementation of performing trusted measurement and control on the trusted function component further includes:

The trusted function component further includes the second operating system boot layer, the second operating system kernel layer, and the trusted application layer. The secure firmware is further configured to perform trusted measurement on the second operating system boot layer based on the root of trust, and control the second operating system boot layer based on a measurement result of the second operating system boot layer. The second operating system boot layer is configured to perform trusted measurement on the second operating system kernel layer based on the root of trust, and control the second operating system kernel layer based on a measurement result of the second operating system kernel layer. The second operating system kernel layer is configured to perform trusted measurement on the trusted application layer based on the root of trust, and control the trusted application layer based on a measurement result of the trusted application layer. The trusted application layer is configured to receive an out-of-band management signal outside the computer system, and provide an operation and maintenance service and/or a security service based on the out-of-band management signal.

The second operating system kernel layer includes a trusted software base module. The trusted software base module is configured to obtain a trusted model of at least one to-be-measured object in the first operating system kernel and the application in the computing component, and a second operating system kernel and trusted application software in the trusted function component, and perform trusted measurement on any to-be-measured object based on a trusted model of the any to-be-measured object. The trusted model of the to-be-measured object is used for reflecting a degree of trust of the to-be-measured object, and the trusted model includes a metric value of the to-be-measured object and another parameter.

By deploying the trusted software base module in the trusted function component, running security of the second operating system can be further ensured, and security of a computer maintained based on the trusted software base module can be further ensured. In addition, the trusted model of the to-be-measured object is obtained by the trusted software base module, and trusted measurement is performed on the to-be-measured object based on the trusted model. Because the trusted model includes a metric value and one or more other parameters, a degree of trust of the to-be-measured object can be reflected from a plurality of dimensions, thereby improving accuracy of describing the degree of trust of the to-be-measured object. When trusted measurement is performed on the to-be-measured object based on the trusted model, security of the to-be-measured object is improved.

In an implementation, the second operating system kernel layer further includes one or more of the following: a trusted measurement policy management module, a trusted control policy management module, a trusted reference library management module, and a trusted measurement result and log management module. The trusted measurement policy management module is configured to manage a measurement policy used in a trusted measurement process, and provide the measurement policy for a measurement subject, where the measurement subject is configured to perform trusted measurement on the to-be-measured object. The trusted control policy management module is configured to manage a control policy used for controlling the to-be-measured object based on a measurement result, and provide the control policy for the measurement subject. The trusted reference library management module is configured to manage a measurement reference used for making a comparison with the metric value of the to-be-measured object in the trusted measurement process, and provide the measurement reference for the measurement subject. The trusted measurement result and log management module is configured to record a trusted measurement result and information used for reflecting the trusted measurement process.

In addition, the second operating system kernel layer further includes trusted middleware. The trusted middleware includes a trusted measurement service module. A function of the second operating system kernel layer to perform trusted measurement on the trusted application layer based on the root of trust is implemented by the trusted measurement service module to perform trusted measurement on the trusted application layer based on the root of trust. The second operating system kernel layer is further configured to perform trusted measurement on the trusted middleware based on the root of trust, and control the trusted middleware based on a measurement result of the trusted middleware.

Further, the trusted middleware further includes one or more of the following: a remote security management proxy module, a remote trusted certification proxy module, and trusted cryptographic service middleware. The remote security management proxy module is configured to provide a remote security management service for the trusted function component based on a connection to the remote security operation and maintenance management center. The remote trusted certification proxy module is configured to provide a remote trusted certification service for the trusted function component based on the connection to the remote security operation and maintenance management center. The trusted cryptographic service middleware is configured to provide, for the computing component and the trusted function component, an application programming interface used for using the cryptographic module.

The trusted measurement includes trusted measurement performed during running of the to-be-measured object and trusted measurement performed in a phase of enabling the to-be-measured object. When trusted measurement is performed during running of the to-be-measured object, the control indicates whether the to-be-measured object continues to be run. When trusted measurement is performed in the phase of enabling the to-be-measured object, the control indicates whether the to-be-measured object is enabled.

Trusted measurement and control are performed on the to-be-measured object in the running and enabling phases, so that a trusted protection capability provided in the embodiment of the present application can cover the running and enabling phases of the computing component and the trusted function component.

According to a second aspect, the present application provides a trusted function component of a computer system. The trusted function component includes a baseboard management controller (BMC) chip, and a secure firmware function layer runs in a security core of the BMC chip. The BMC chip is configured to construct a root of trust in the BMC chip by running the secure firmware function layer, perform trusted measurement on at least one to-be-measured object in a computing component of the computer system, and control any one of the at least one to-be-measured object based on a trusted measurement result of the any to-be-measured object. The at least one to-be-measured object includes one or more of the following: a configuration file of a complex programmable logic device, an image file of a basic input/output apparatus, an image file of a first operating system kernel, an image file of a first operating system boot layer, and an image file of a business application.

According to a third aspect, the present application provides a trusted function component of a computer system. The trusted function component includes a baseboard management controller BMC chip, and the BMC chip includes a security core and a performance core. The security core is configured to construct a root of trust in the BMC chip by running a secure firmware enable layer, perform trusted measurement on the trusted function component and a computing component of the computer system, and control a to-be-measured object based on a trusted measurement result of the to-be-measured object.

The to-be-measured object includes one or more of the following: an image file of a secure firmware boot layer, an image file of a secure firmware function layer, an image file of a second operating system boot layer, an image file of a second operating system kernel layer, and an image file of a trusted application layer, and a configuration file of a complex programmable logic device, an image file of a basic input/output apparatus, an image file of a first operating system kernel, an image file of a first operating system boot layer, and an image file of a business application in a computing component. The secure firmware boot layer and the secure firmware function layer are configured to be run by the security core, and the second operating system boot layer, the second operating system kernel layer, and the trusted application layer are configured to be run by the performance core.

In a possible implementation, the secure firmware enable layer is configured to perform trusted measurement on the secure firmware boot layer based on the root of trust constructed in the BMC chip, and control the secure firmware boot layer based on a measurement result of the secure firmware boot layer. The secure firmware boot layer is configured to perform trusted measurement on the secure firmware function layer based on the root of trust, and control the secure firmware function layer based on a measurement result of the secure firmware function layer. The secure firmware function layer is configured to perform trusted measurement on a second operating system boot layer, and control the second operating system boot layer based on a trusted measurement result of the second operating system boot layer. The second operating system boot layer is configured to perform trusted measurement on a second operating system kernel layer based on the root of trust, and control the second operating system kernel layer based on a measurement result of the second operating system kernel layer. The second operating system kernel layer is configured to perform trusted measurement on a trusted application layer based on the root of trust, and control the trusted application layer based on a measurement result of the trusted application layer. The trusted application layer is configured to receive an out-of-band management signal outside the computer system, and provide an operation and maintenance service and/or a security service based on the out-of-band management signal.

According to a fourth aspect, the present application provides a computer system. The computer system includes a remote security operation and maintenance management center, and the remote security operation and maintenance management center is configured to provide a remote centralized management service and an operation and maintenance service for the trusted function component provided in the first aspect, the second aspect, or the third aspect.

The remote security operation and maintenance management center includes one or more of the following: a remote trusted certification center, a trusted policy and reference management center, and a platform security management and audit center. The remote trusted certification center is configured to provide a trusted challenge and a remote trusted certification service for a computer. The trusted policy and reference management center is configured to manage a trusted measurement policy, a control policy, and a trusted reference library in the computer. The platform security management and audit center is configured to provide a remote connection interface, provide a trusted measurement result visualization interface function, and a trusted log audit function for a boot layer trusted component in the computer.

By configuring the remote security operation and maintenance management center for the computer, the computer provided in the present application can cooperate with the remote security operation and maintenance management center to provide a rich security operation and maintenance management capability and a remote trusted certification service capability, so as to establish a trusted measurement subject and a trusted software execution environment in the trusted function component of the computer system.

According to a fifth aspect, the present application provides a method for running a computer system. The method includes: An out-of-band management chip of a computer system constructs a root of trust in the out-of-band management chip by running secure firmware, performs trusted measurement on a computing component of the computer system based on the root of trust, and controls the computing component based on a trusted measurement result, and the computing component performs, based on control of the out-of-band management chip, an operation indicated by the control.

In the method for running a computer system, the root of trust is constructed in the out-of-band management chip. Because the out-of-band management chip has a feature of more secure hardware, security of the constructed root of trust can be ensured. In addition, trusted measurement and control are performed on the computing component and the trusted function component based on the root of trust, so that security of trusted measurement and control can be ensured.

A security core is further configured to construct the root of trust in the security core by running the secure firmware.

In a possible implementation, a core root of trust for measurement configured to construct the root of trust is stored in a read-only memory of the out-of-band management chip.

In a possible implementation, the secure firmware is further configured to perform trusted measurement on the computing component, and control the computing component based on a trusted measurement result of the computing component.

In addition, the secure firmware performs trusted measurement on at least two to-be-measured objects in the computing component, and controls any one of the at least two to-be-measured objects based on a trusted measurement result of the any to-be-measured object.

The to-be-measured object in the computing component includes an image file of a basic input/output apparatus, an image file of a first operating system kernel, an image file of a first operating system boot layer, and an image file of a business application.

Optionally, the to-be-measured object in the computing component further includes a configuration file of a complex programmable logic device.

The secure firmware includes a secure firmware enable layer, a secure firmware boot layer, and a secure firmware function layer. To further improve security of the computer, trusted measurement and control can also be performed on the trusted function component. Correspondingly, the method further includes: The out-of-band management chip runs the secure firmware enable layer, and constructs the root of trust in the out-of-band management chip. The secure firmware enable layer performs trusted measurement on the secure firmware boot layer based on the root of trust, and controls the secure firmware boot layer based on a measurement result of the secure firmware boot layer. The secure firmware boot layer performs trusted measurement on the secure firmware function layer based on the root of trust, and controls the secure firmware function layer based on a measurement result of the secure firmware function layer. The secure firmware function layer performs trusted measurement on another to-be-measured object, and controls the another to-be-measured object based on a trusted measurement result of the another to-be-measured object. The another to-be-measured object includes a to-be-measured object other than the secure firmware in the computer system.

In a possible implementation, the out-of-band management chip has the security core, and the security core is further configured to run the secure firmware enable layer, the secure firmware boot layer, and the secure firmware function layer.

In addition, the out-of-band management chip has a performance core, and the performance core is configured to run a second operating system.

In this case, the method further includes: The out-of-band management chip runs a second operating system boot layer, a second operating system kernel layer, and a trusted application layer of the computer system. The secure firmware performs trusted measurement on the second operating system boot layer based on the root of trust, and controls the second operating system boot layer based on a measurement result of the second operating system boot layer. The second operating system boot layer performs trusted measurement on the second operating system kernel layer based on the root of trust, and controls the second operating system kernel layer based on a measurement result of the second operating system kernel layer. The second operating system kernel layer performs trusted measurement on a trusted application layer based on the root of trust, and controls the trusted application layer based on a measurement result of the trusted application layer. The trusted application layer is configured to receive an out-of-band management signal outside the computer system, and provide an operation and maintenance service and/or a security service based on the out-of-band management signal.

Optionally, the second operating system kernel layer includes a trusted software base module. The method further includes: The trusted software base module obtains a trusted model of at least one to-be-measured object in the first operating system kernel and the application of the computing component, and the second operating system kernel and trusted application software in the trusted function component, and performs trusted measurement on any to-be-measured object based on the trusted model of any to-be-measured object. The trusted model of the to-be-measured object is used for reflecting a degree of trust of the to-be-measured object, and the trusted model includes a metric value of the to-be-measured object and another parameter.

In addition, the second operating system kernel layer further includes one or more of the following: a trusted measurement policy management module, a trusted control policy management module, a trusted reference library management module, and a trusted measurement result and log management module. In this case, the method further includes one or more of the following operations: The trusted measurement policy management module manages a measurement policy used in a trusted measurement process, and provides the measurement policy for a measurement subject, where the measurement subject is configured to perform trusted measurement on the to-be-measured object. The trusted control policy management module manages a control policy used for controlling the to-be-measured object based on a measurement result, and provides the control policy for the measurement subject. The trusted reference library management module manages a measurement reference used for making a comparison with the metric value of the to-be-measured object in the trusted measurement process, and provides the measurement reference for the measurement subject. The trusted measurement result and log management module records the trusted measurement result and information used for reflecting the trusted measurement process.

Further, the second operating system kernel layer further includes trusted middleware. The trusted middleware includes a trusted measurement service module. Correspondingly, a function of the second operating system kernel layer to perform trusted measurement on the trusted application layer based on the root of trust is implemented by the trusted measurement service module by performing trusted measurement on the trusted application layer based on the root of trust. In addition, the method further includes: The second operating system kernel layer performs trusted measurement on the trusted middleware based on the root of trust, and controls the trusted middleware based on a measurement result of the trusted middleware.

Optionally, the trusted middleware further includes one or more of the following: a remote security management proxy module, a remote trusted certification proxy module, and trusted cryptographic service middleware. Correspondingly, the method further includes one or more of the following: The remote security management proxy module provides a remote security management service for the trusted function component based on a connection to a remote security operation and maintenance management center. The remote trusted certification proxy module provides a remote trusted certification service for the trusted function component based on the connection to the remote security operation and maintenance management center. The trusted cryptographic service middleware provides, for the computing component and the trusted function component, an application programming interface used for using the cryptographic module.

The trusted measurement includes trusted measurement performed during running of the to-be-measured object and trusted measurement performed in a phase of enabling the to-be-measured object. When trusted measurement is performed during running of the to-be-measured object, control indicates whether the to-be-measured object continues to be run. When trusted measurement is performed in the phase of enabling the to-be-measured object, the control indicates whether the to-be-measured object is enabled.

According to a sixth aspect, the present application provides a method for running a trusted function component of a computer system. The trusted function component includes a baseboard management controller BMC chip. The method includes: The BMC chip constructs a root of trust in the BMC chip by running a secure firmware function layer of a computer, performs trusted measurement on at least one to-be-measured object in a computing component of the computer system, and controls any one of the at least one to-be-measured object based on a trusted measurement result of the any to-be-measured object.

The at least one to-be-measured object includes one or more of the following: a configuration file of a complex programmable logic device, an image file of a basic input/output apparatus, an image file of a first operating system kernel, an image file of a first operating system boot layer, and an image file of a business application.

According to a seventh aspect, the present application provides a method for running a trusted function component of a computer system. The trusted function component includes a baseboard management controller BMC chip, and the BMC chip includes a security core and a performance core. The method includes: The security core constructs a root of trust in the BMC chip by running a secure firmware enable layer, performs trusted measurement on the trusted function component and a computing component of the computer system, and controls a to-be-measured object based on a trusted measurement result of the to-be-measured object.

The to-be-measured object includes one or more of the following: an image file of a secure firmware boot layer, an image file of a secure firmware function layer, an image file of a second operating system boot layer, an image file of a second operating system kernel layer, and an image file of a trusted application layer, and a configuration file of a complex programmable logic device, an image file of a basic input/output apparatus, an image file of a first operating system kernel, an image file of a first operating system boot layer, and an image file of a business application in a computing component. The secure firmware boot layer and the secure firmware function layer are configured to be run by the security core, and the second operating system boot layer, the second operating system kernel layer, and the trusted application layer are configured to be run by the performance core.

In an implementation, a process in which the BMC chip performs a trusted measurement includes: The secure firmware enable layer performs trusted measurement on the secure firmware boot layer based on the root of trust constructed in the BMC chip, and controls the secure firmware boot layer based on a measurement result of the secure firmware boot layer. The secure firmware boot layer performs trusted measurement on the secure firmware function layer based on the root of trust, and controls the secure firmware function layer based on a measurement result of the secure firmware function layer. The secure firmware function layer performs trusted measurement on the second operating system boot layer, and controls the second operating system boot layer based on a trusted measurement result of the second operating system boot layer. The second operating system boot layer performs trusted measurement on the second operating system kernel layer based on the root of trust, and controls the second operating system kernel layer based on a measurement result of the second operating system kernel layer. The second operating system kernel layer performs trusted measurement on the trusted application layer based on the root of trust, and controls the trusted application layer based on a measurement result of the trusted application layer. The trusted application layer receives an out-of-band management signal outside the computer system, and provides an operation and maintenance service and/or a security service based on the out-of-band management signal.

According to an eighth aspect, the present application provides a method for running a computer system. The method includes: A remote security operation and maintenance management center of a computer system provides a remote centralized management service and an operation and maintenance service for the trusted function component provided in the first aspect, the second aspect, or the third aspect.

In a possible implementation, the remote security operation and maintenance management center provides the remote centralized management service and the operation and maintenance service, including one or more of the following: A remote trusted certification center provides a trusted challenge and a remote trusted certification service for a computer. A trusted policy and reference management center manages a trusted measurement policy, a trusted control policy, and a trusted reference library in the computer. The platform security management and audit center provides a remote connection interface, provides a trusted measurement result visualization interface, and provides a trusted log audit function for a boot layer trusted component in the computer.

DESCRIPTION OF EMBODIMENTS

Figure 1:
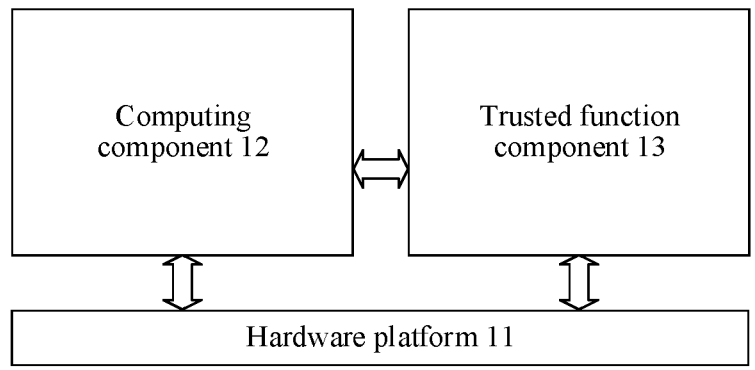
FIG. 1 is a schematic structural diagram of a computer according to an embodiment of the present application.

To make the objectives, technical solutions, and advantages of the present application clearer, the following further describes the implementations of the present application in detail with reference to the accompanying drawings.

For ease of understanding, the following first explains some nouns or terms in embodiments of the present application.

Trusted computing (TC) is a widely used trusted computing platform based on a cryptographic module to improve the overall security of the computer.

The cryptographic module is a security chip that provides integrity and authenticity assurance for a computer, and is usually strongly bound to a computer hardware platform in a physical manner. A core function of the cryptographic module is to construct three dimensions of the trusted computing based on an autonomous cryptographic algorithm, including platform integrity measurement and verification, platform trusted identification and authentication, and platform data protection. Optionally, the cryptographic module may be a trusted cryptographic module (TCM) or a trusted platform module (TPM).

Trusted control refers to a control operation performed on a to-be-measured object based on a trusted measurement result. Therefore, the trusted control may also be referred to as control. When the measurement on the to-be-measured object succeeds, an original state of the to-be-measured object can be maintained, or an operation that is expected to be performed before the to-be-measured object is performed a trusted measurement. When the measurement on the to-be-measured object does not succeed, a security measure can be taken on the to-be-measured object, for example, a computer reset may be controlled, or the to-be-measured object may be controlled to re-enable, so as to avoid a security threat to the computer caused by a measurement failure.

A root of trust (RoT) is a source of trust in a trusted measurement and is a component that is definitely trusted. A trusted computing platform includes three types of roots of trust: a root of trust for measurement (RTM), a root of trust for storage (RTS), and a root of trust for reporting (RTR). The root of trust for measurement is a root of trust that needs to be used when a measurement operation is involved, the root of trust for storage is a root of trust that needs to be used when a storage operation is involved, and the root of trust for reporting is a root of trust that needs to be used when an operation such as report read/write is involved.

A CRTM is executable code used for establishing the root of trust for measurement, and the root of trust for measurement can be established by running the core root of trust for measurement. The core root of trust for measurement is a first segment of code executed after the trusted computing platform is powered on.

A trusted software base is an important part of a trusted computing system, and it is designed based on a dual system architecture that involves both computing and protection. The dual system at a software layer is host basic software and the trusted software base. The trusted software base performs a proactive interception and measurement during running of the host basic software without modifying an original application and implements proactive real-time protection by making policies to damage and prevent malicious software such as viruses or Trojan horses from entering the system, achieving a security effect of proactive immune defense.

A BMC is widely used in an out-of-band management subsystem of a processor of server computer platforms. Functions of the baseboard management controller include such as a virtual keyboard, a mouse, a display, power management control, and remote operation and maintenance, and also include monitoring of logistics information such as a power voltage, a temperature, fan status, and chassis status of a server platform. The baseboard management controller is the first component that is powered on of a mainboard.

A basic input/output system (BIOS) implements a basic input/output (I/O) operation through an I/O interface.

FIG. 1 is a schematic structural diagram of a computer according to an embodiment of the present application. The computer may be any type of server, desktop computer, or laptop computer. As shown in FIG. 1, the computer includes a hardware platform 11, a computing component 12 that runs based on the hardware platform 11, and a trusted function component 13. A communication connection is established between the hardware platform 11, the computing component 12, and the trusted function component 13.

Figure 2:
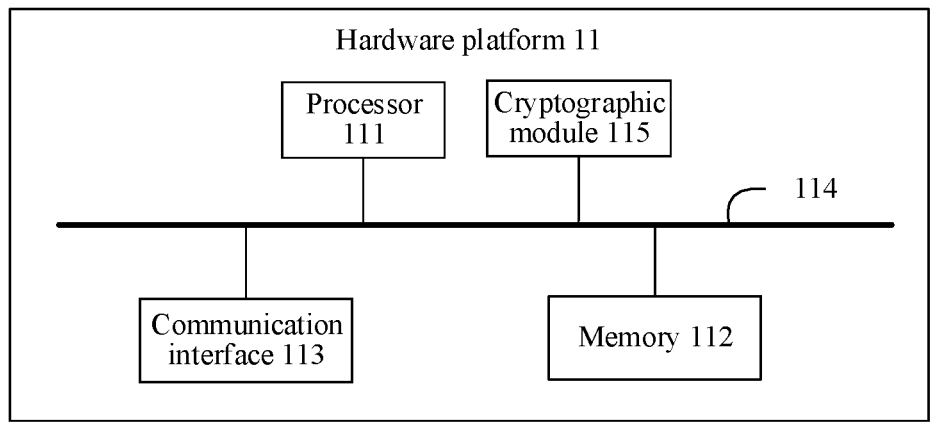
FIG. 2 is a schematic structural diagram of a hardware platform according to an embodiment of the present application.

The hardware platform 11 includes various hardware required for running the computer. For example, as shown in FIG. 2, the hardware platform 11 includes a processor 111, a memory 112, a communication interface 113, a bus 114, a cryptographic module 115, and the like.

The processor may be a general-purpose processor, for example, a central processing unit (CPU).

The memory may include a plurality of types of memories. For example, the memory may include a read-only memory (ROM), or the memory may include a volatile memory, such as a random-access memory (RAM). The memory may further include a non-volatile memory, for example, a NAND flash memory, a flash memory, a hard disk drive (HDD), or a solid state-drive (SSD). In addition, the memory may further include a combination of the foregoing types of memories.

The communication interface may be any one or any combination of the following devices with a network access function, such as a network interface (for example, an Ethernet interface) and a wireless network interface card. Buses may be classified into an address bus, a data bus, a control bus, and the like.

The cryptographic module 115 may be a TCM, a TPM, or the like. In the embodiment of the present application, the cryptographic module 115 may be a cryptographic chip or module that meets a requirement of a standard GM/T 0013-2012 Trusted Computing Trusted Cryptographic Module Conformity Detection Specification, and provides a ShangMi 3 (SM3) and a state cryptographic algorithm service, so as to store a non-volatile register for a metric value and an application command interface through a serial peripheral interface (SPI).

The computing component 12 is configured to provide a computing service for a user. The computing component 12 includes a BIOS, a first operating system boot layer, a first operating system kernel, and a business application. The business application is used for receiving a task request submitted by the user, executing, based on the task request, a computing task that is requested to be performed by the task request, and providing a computing result for the user.

The trusted function component 13 is a first component that is powered on and runs on the computer, and is configured to provide an out-of-band management service for the computing component 12. The out-of-band management service may include controlling status and a behavior of the computing component 12, providing an operation and maintenance management capability for the computing component 12, and performing a trusted measurement, trusted control, and security operation and maintenance on the computing component 12. In a possible implementation, the trusted function component 13 may perform trusted measurement and trusted control on the computing component 12 in phases of enabling and running of the computing component 12, to ensure secure and trusted enabling and running of the computer.

Figure 3:
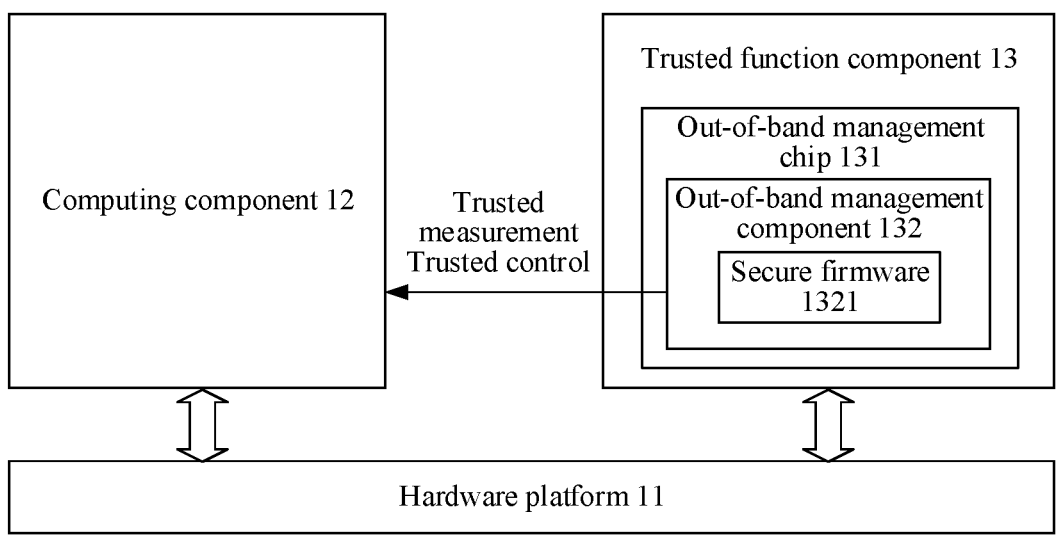
FIG. 3 is a schematic structural diagram of another computer according to an embodiment of the present application.

As shown in FIG. 3, the trusted function component 13 includes an out-of-band management chip 131. An out-of-band management component 132 runs in the out-of-band management chip 131. Optionally, the out-of-band management chip 131 may be a baseboard management controller. In this case, the trusted function component 13 is also referred to as a BMC trusted function component or a BMC out-of-band management system.

FIG. 3 is a schematic diagram of a computer system according to an embodiment of the present application. As shown in FIG. 3, a computer system includes a computing component 12 and a trusted function component 13, and the trusted function component 13 includes an out-of-band management chip 131. An out-of-band management component 132 runs on the out-of-band management chip 131, and the out-of-band management component 132 includes secure firmware 1321.

The out-of-band management chip 131 is configured to construct a root of trust in the out-of-band management chip 131 by running the secure firmware 1321, perform trusted measurement on the computing component 12 based on the root of trust, and perform trusted control (also referred to as control) on the computing component 12 based on a trusted measurement result. A process of constructing the root of trust by running the secure firmware 1321 may include driving a cryptographic module 115 by running the secure firmware 1321, and constructing the root of trust in the out-of-band management chip 131 by using the cryptographic module 115. There is also a relationship between trusted measurement and trusted control, such as certificate verification, signature authentication, integrity measurement, enabling and control.

The computing component 12 is configured to perform, based on the trusted control of the out-of-band management chip 131, an operation indicated by the trusted control.

It can be learned from the foregoing that, by constructing the root of trust in the out-of-band management chip 131, because the out-of-band management chip 131 has a feature of more secure hardware, security of a constructed root of trust can be ensured, thereby ensuring security of performing trusted measurement and trusted control on the computing component 12 by using the root of trust.

In the embodiment of the present application, the trusted measurement includes trusted measurement performed during running of a to-be-measured object and trusted measurement performed in a phase of enabling the to-be-measured object. When trusted measurement is performed during running of the to-be-measured object, the trusted control indicates whether the to-be-measured object continues to be run. Trusted measurement and trusted control are performed on the to-be-measured object during running of the to-be-measured object, so that security of the to-be-measured object during running can be effectively ensured. When trusted measurement is performed in the phase of enabling the to-be-measured object, the trusted control indicates whether the to-be-measured object is enabled, and trusted measurement and trusted control are performed on the to-be-measured object in the phase of enabling the to-be-measured object, so that effectively ensure security of the to-be-measured object in the phase of enabling.

It can be learned from the foregoing that, to construct the root of trust by running the secure firmware 1321, a function of constructing the root of trust is implemented by running a CRTM in the secure firmware 1321. Because the root of trust is a source of trust of an entire trusted computing platform, after the out-of-band management subsystem is powered on, the CRTM can be automatically loaded to an executable memory area for execution, and the CRTM is a first segment of code executed after the out-of-band management subsystem is powered on.

Optionally, the out-of-band management chip 131 has a security core. In this case, an operation of constructing the root of trust may be implemented by using the security core. In other words, the security core is further configured to construct the root of trust in the security core by running the secure firmware 1321. Correspondingly, the CRTM may run in a security domain memory of the out-of-band management chip 131. In this case, the secure firmware 1321 is also referred to as a security core firmware.

Because the security core implements physical isolation, the physical isolation can ensure security in the security core. Therefore, a process of constructing the root of trust by using the security core can further ensure security of a constructed root of trust.

In a possible implementation, the CRTM is stored in a ROM of the out-of-band management chip 131. For example, the CRTM is preset in the read-only memory before delivery.

Because the CRTM is stored in the read-only memory, the read-only memory can be accessed only by the security core of the out-of-band management chip 131, and a read operation can be performed only on the read-only memory, rather than a write operation. When executable code stored in the read-only memory needs to be maliciously tampered with, because the read-only memory does not support re-writing, malicious tampering of the executable code stored in the read-only memory can be prevented, and security of the CRTM stored in the read-only memory can be ensured, the security of the root of trust constructed based on the CRTM can be further ensured.

Optionally, in the trusted function component 13 provided in the embodiment of the present application, a process of performing trusted measurement and trusted control on the computing component 12 may be performed by the secure firmware 1321.

Figure 4:
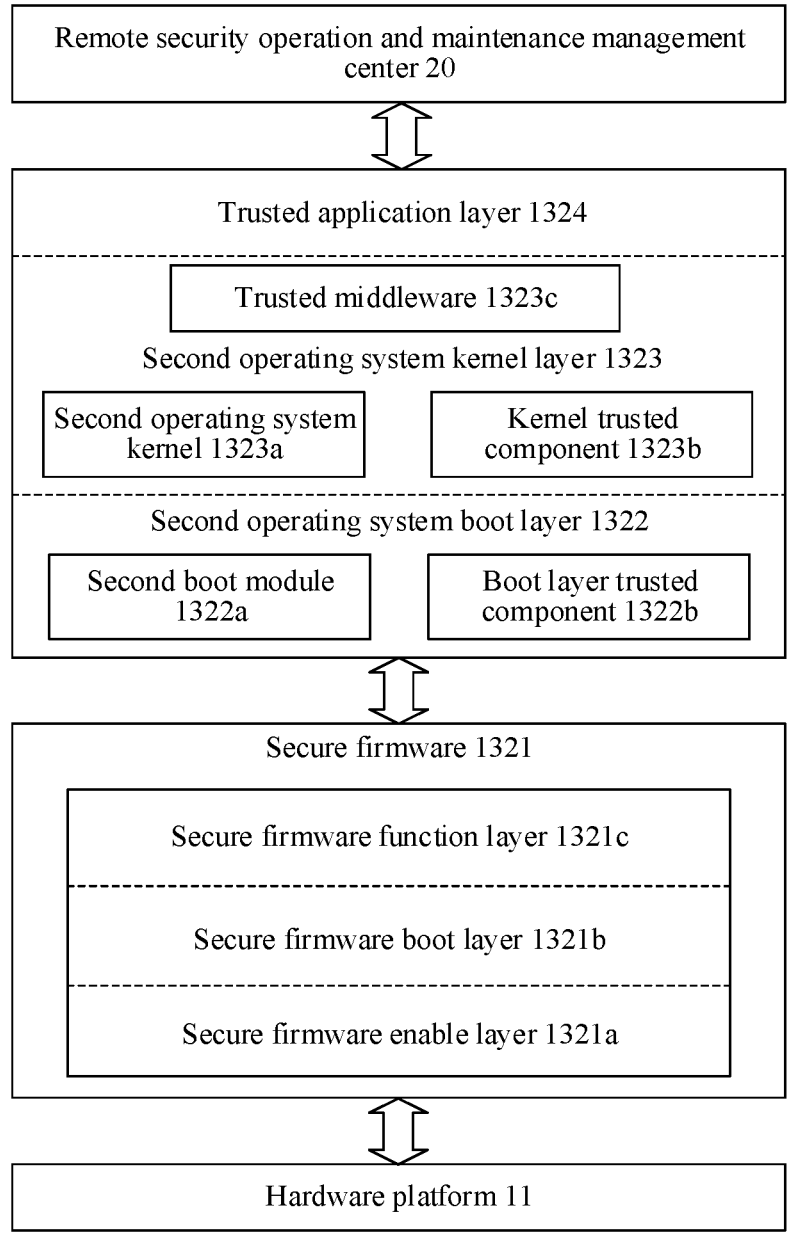
FIG. 4 is a schematic structural diagram of a computer system according to an embodiment of the present application.

In addition, as shown in FIG. 4, a secure firmware 1321 includes a secure firmware enable layer 1321a, a secure firmware boot layer 1321b, and a secure firmware function layer 1321c. The secure firmware enable layer 1321a is a set that includes executable code, and the set includes a CRTM. When the security core runs the secure firmware enable layer 1321a, the secure firmware enable layer 1321a is also referred to as a security core firmware enable layer. In addition, when the secure firmware enable layer 1321a is stored in a read-only memory, the secure firmware enable layer 1321a is also referred to as a security core ROM code segment. When the security core runs the secure firmware boot layer 1321b, the secure firmware boot layer 1321b is also referred to as a security core firmware boot layer. When the security core runs the secure firmware function layer 1321c, the secure firmware function layer 1321c is also referred to as a security core firmware function layer.

The secure firmware boot layer 1321b is a boot loader, and is configured to boot the secure firmware function layer 1321c to enable. An image file of the secure firmware boot layer 1321b is stored in a non-volatile flash memory outside an out-of-band management chip 131. Optionally, the non-volatile flash memory further has functions of identifying and controlling data access permission of the non-volatile flash memory, performing content encryption on content stored in the non-volatile flash memory, and providing write protection, so as to improve a hardware security protection capability of the content stored in the non-volatile flash memory. In this case, the non-volatile flash memory is also referred to as a storage device having a hardware protection function.

The secure firmware function layer 1321c is configured to implement an operation performed by the secure firmware 1321 on another component. An image file of the secure firmware function layer 1321c is stored in the non-volatile flash memory outside the out-of-band management chip 131, for example, stored in a storage device having the hardware protection function. The other components include software, firmware, and hardware other than the secure firmware 1321.

For example, the another component may be a computing component 12. Therefore, a process of performing trusted measurement and trusted control on the computing component 12 may be performed by the secure firmware function layer 1321c. In addition, the other components may include a device to which an out-of-band management subsystem needs to be connected. In this case, functions of the secure firmware function layer 1321c may include implementing an embedded multimedia card (eMMC) interface driver, an SPI interface driver, an SPI flash controller (SFC) interface driver, a CPU bus (also referred to as a local bus) interface driver, a gigabit media access control (GMAC) interface driver, a double data rate (DDR) memory interface driver, and a Peripheral Component Interconnect Express (PCIe), a bus interface driver, and the like. Interfaces corresponding to the interface drivers are all interfaces that need to be used by a trusted function component 13.

An eMMC interface is a standard flash management interface established by a multimedia card (MMC) association. In the embodiment of the present application, the eMMC interface is configured to interconnect to an eMMC controller interface encapsulated in the non-volatile flash memory, and the eMMC interface driver is configured to drive and mount the storage device having the hardware protection function. A SPI interface is a serial full-duplex synchronous communication bus interface. In the embodiment of the present application, the SPI interface is mainly configured to read content in a memory device of a BIOS 121. The SPI flash controller is a highly customized serial interface based on the SPI interface and a SPI flash interface logic protocol and is mainly configured to interconnect to a SPI flash controller peripheral. In the embodiment of the present application, the SPI flash controller is used as a basic interface of an integrated cryptographic module 115. The local bus is a conventional data address multiplexing bus form. In the embodiment of the present application, the local bus uses a 60× bus 16-bit width mode, and is mainly used as a control interface between the out-of-band management chip 131 and a complex programmable logic device (CPLD) of a computer. The CPLD is used as a logic controller of power supply and a circuit of a computer mainboard. A PCIe interface is a high-speed serial computer expansion bus standard interface authenticated by a peripheral component interconnect special interest (PCI-SIG) and configured to high-speed serial point-to-point dual-channel high-bandwidth transmission. A device connected to the PCIe interface exclusively use the channel bandwidth and do not share a bus bandwidth. In the embodiment of the present application, a PCIe x1 physical interface (a PCIe interface) is used, and is configured to establish a secure and trusted interaction channel between a trusted function component 13 and the computing component 12. A GMAC interface is mainly configured to connect the out-of-band management chip 131 to a network interface controller device. A DDR interface is a double data rate synchronous dynamic random access memory. The DDR memory interface driver is configured to perform application isolation and security protection on a shared memory.

Figure 6:
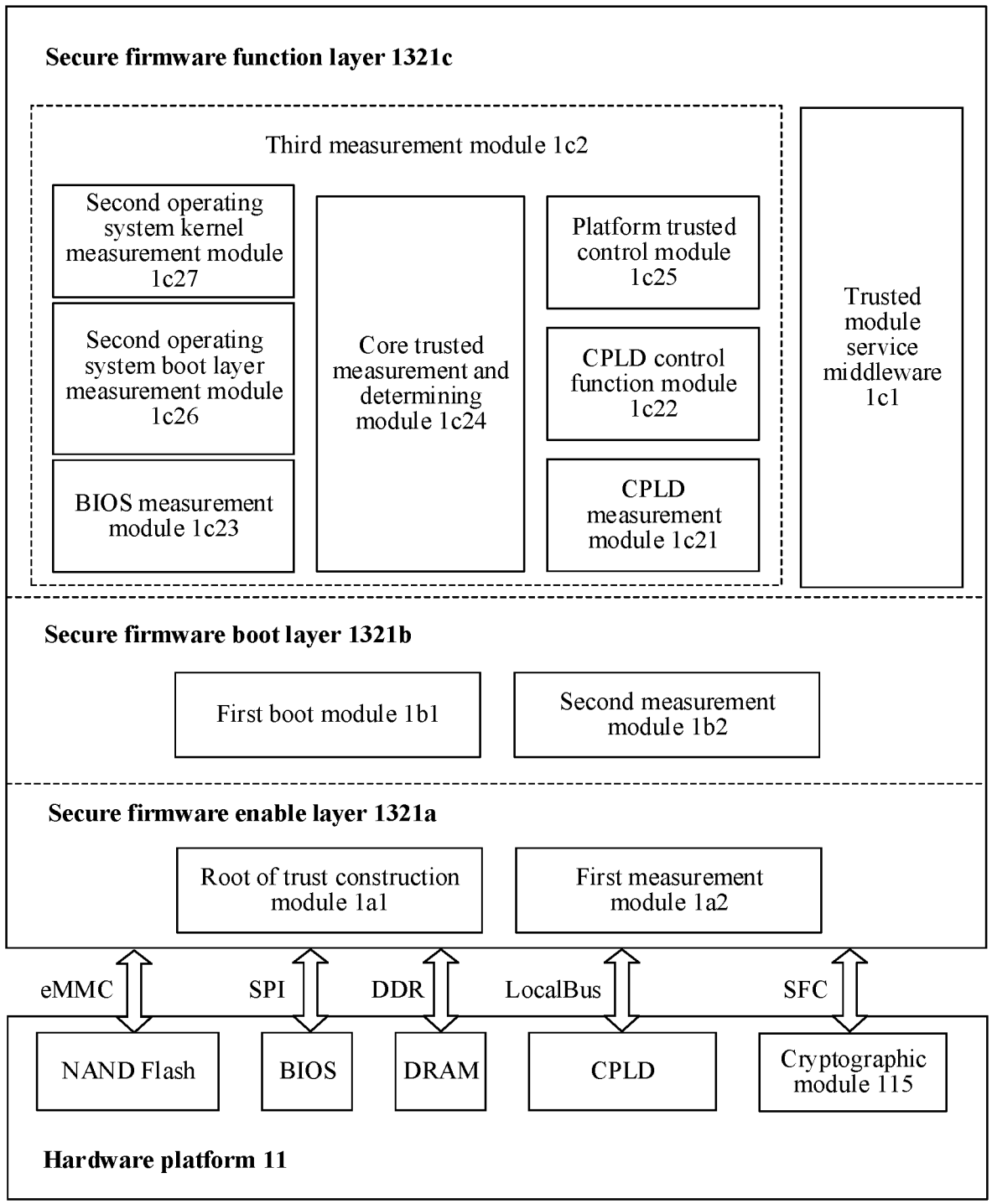
FIG. 6 is a schematic structural diagram of another computer system according to an embodiment of the present application.

As shown in FIG. 6, a hardware platform 11 may include a NAND flash, a BIOS, a dynamic random access memory (DRAM), a CPLD, and a cryptographic module 115. The NAND flash may be connected to an out-of-band management chip by using an eMMC interface, the BIOS may be connected to the out-of-band management chip by using an SPI interface, the DRAM may be connected to the out-of-band management chip by using a DDR memory interface, the CPLD may be connected to the out-of-band management chip by using a local bus, and the cryptographic module 115 may be connected to the out-of-band management chip 131 by using an SFC interface.

In this case, a process in which the secure firmware 1321 performs trusted measurement and trusted control on a computing component 12 may be performed by a secure firmware function layer 1321c. In other words, the secure firmware function layer 1321c is further configured to perform trusted measurement on the computing component 12, and perform trusted control on the computing component 12 based on a trusted measurement result of the computing component 12.

Figure 5:
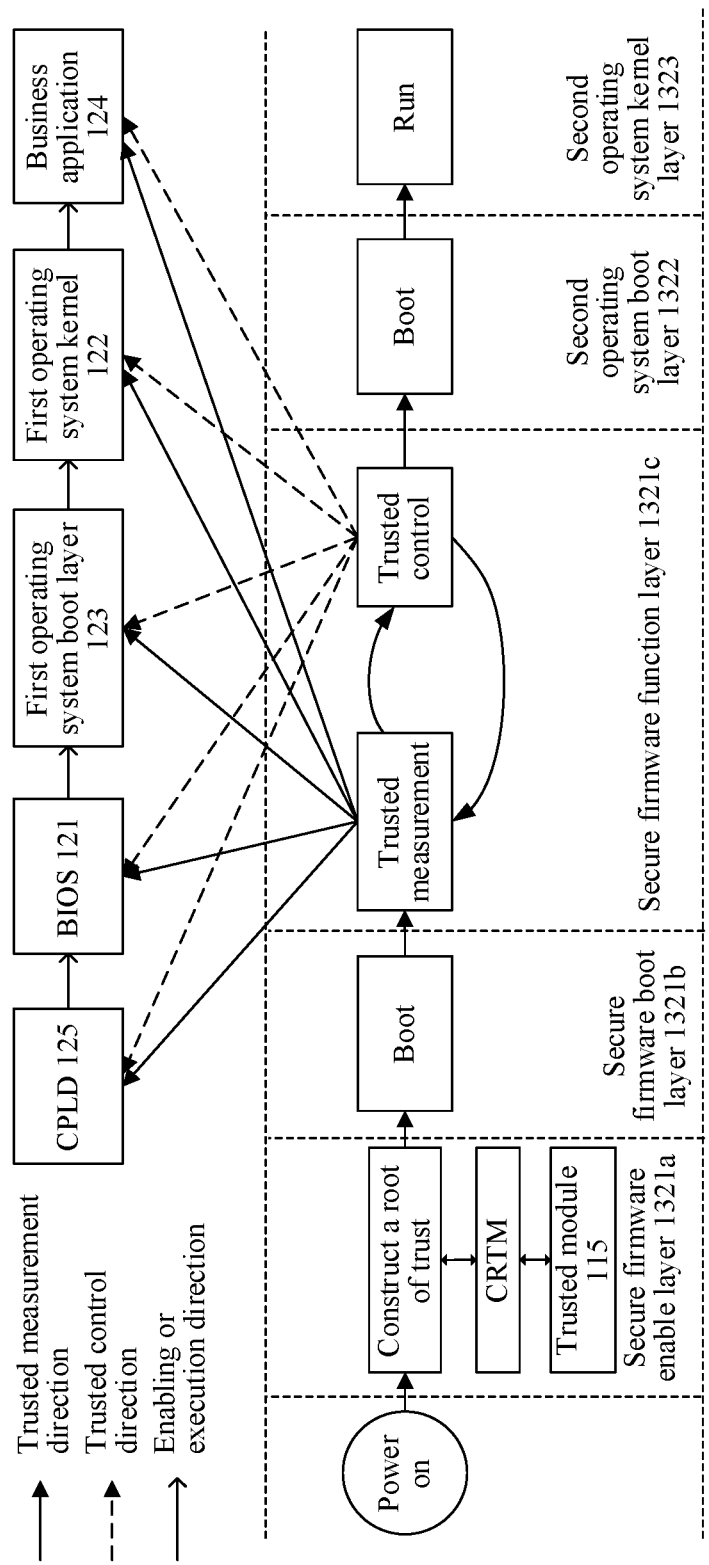
FIG. 5 is a schematic diagram of a centralized trusted topology structure according to an embodiment of the present application.

The computing component 12 includes a plurality of to-be-measured objects. For example, as shown in FIG. 5, to-be-measured object in the computing component 12 includes an image file of a BIOS 121, an image file of a first operating system kernel 122, an image file of a first operating system boot layer 123, and an image file of a business application 124. Optionally, the to-be-measured object in the computing component 12 further includes a configuration file of a complex programmable logic device (CPLD) 125. The configuration file of the complex programmable logic device 125 is configured to configure a logic function of the complex programmable logic device 125. Trusted measurement is performed on the complex programmable logic device 125, so that security of enabling and running of the complex programmable logic device 125 can be ensured.

In a possible implementation, as shown in FIG. 5, when the computing component 12 includes a plurality of to-be-measured objects, a secure firmware function layer 1321c is configured to perform trusted measurement and trusted control on at least one of the plurality of to-be-measured objects. FIG. 5 is a schematic diagram in which the secure firmware function layer 1321c performs trusted measurement and trusted control on the CPLD 125, the BIOS 121, the first operating system kernel 122, the first operating system boot layer 123, and the business application 124.

In this case, the secure firmware function layer 1321c is configured to perform trusted measurement and trusted control on the at least one to-be-measured object in the computing component 12. Compared with the trusted measurement and trusted control process of the to-be-measured object in the computing component in conventional technologies, a measurement subject can be centralized on the secure firmware function layer 1321c as much as possible, so that the to-be-measured object can be as close as possible to a root of trust, and a problem that identities of the measurement subject and the to-be-measured object are confused, and a boundary between a trusted domain and an untrusted domain is blurred caused by a reason that the measurement subject in the computing component 12 is also a to-be-measured object can be solved, this can further ensure security of the computing component 12.

In addition, the secure firmware function layer 1321c performs trusted measurement on at least two to-be-measured objects in the computing component 12, so that the trusted measurement and trusted control process of the at least two to-be-measured objects can be independent of each other. A chain-based chain of trust in a related technology is changed to a centralized trusted topology structure centered on the secure firmware function layer 1321c, so that a case in which an entire chain of trust is broken because a to-be-measured object in the computing component 12 is attacked or tampered with can be avoided.

In related technologies, a process of performing trusted measurement on the to-be-measured object in the computing component is: Measurement is performed on an image file of the BIOS by using the root of trust, then the BIOS performs an image file of the first operating system boot layer, and then the first operating system boot layer performs trusted measurement on an image file of the first operating system kernel. Therefore, the chain of trust in the related technology is a chain of trust that is sequentially transferred from the root of trust to the BIOS, the first operating system boot layer, and the first operating system kernel.

Because a trusted function component 13 is configured to control a status and a behavior of the computing component 12, and perform the trusted measurement, the trusted control, and security operation and maintenance on the computing component 12, a secure and trusted attribute of the trusted function component 13 becomes a security basis of a trusted computing platform, and ensuring security of software and firmware deployed and executed in the trusted function component 13 is a problem that needs to be first solved to construct the secure and trusted attribute of the trusted computing platform. Therefore, to further improve security of the computer, a trusted measurement and trusted control may also be performed on the trusted function component 13, and an implementation of trusted measurement and control includes:

A secure firmware enable layer 1321a is further configured to perform trusted measurement on a secure firmware boot layer 1321b based on the root of trust, and perform trusted control on the secure firmware boot layer 1321b based on a measurement result of the secure firmware boot layer 1321b. When the trusted measurement on the secure firmware boot layer 1321b succeeds, the trusted control on the secure firmware boot layer 1321b includes allowing the out-of-band management chip 131 to load and execute the secure firmware boot layer 1321b. When the trusted measurement on the secure firmware boot layer 1321b does not succeed, the trusted control on the secure firmware boot layer 1321b does not include allowing the out-of-band management chip 131 to load and execute the secure firmware boot layer 1321b.

The secure firmware boot layer 1321b is configured to perform trusted measurement on the secure firmware function layer 1321c based on the root of trust, and perform trusted control on the secure firmware function layer 1321c based on a measurement result of the secure firmware function layer 1321c. When the trusted measurement on the secure firmware function layer 1321c succeeds, the trusted control on the secure firmware function layer 1321c includes allowing the out-of-band management chip 131 to load and execute the secure firmware function layer 1321c. When the trusted measurement on the secure firmware function layer 1321c does not succeed, the trusted control on the secure firmware function layer 1321c does not include allowing the out-of-band management chip 131 to load and execute the secure firmware function layer 1321c.

The secure firmware function layer 1321c is configured to perform trusted measurement on another to-be-measured object, and perform trusted control on the another to-be-measured object based on a trusted measurement result of the another to-be-measured object. The another to-be-measured object includes a to-be-measured object other than the secure firmware 1321 in the computer system. For example, the another to-be-measured object may be a to-be-measured object in the computing component 12, or the another to-be-measured object may be a second operating system boot layer 1322 running on the out-of-band management chip 131. When the trusted measurement on the another to-be-measured object succeeds, the trusted control on the another to-be-measured object includes allowing enabling or running the another to-be-measured object. When the trusted measurement on the another to-be-measured object does not succeed, the trusted control on the another to-be-measured object does not include allowing enabling or running the another to-be-measured object.

In a possible implementation, a plurality of function modules may be deployed in the secure firmware enable layer 1321a, the secure firmware boot layer 1321b, and the secure firmware function layer 1321c. The foregoing functions of the secure firmware enable layer 1321a, the secure firmware boot layer 1321b, and the secure firmware function layer 1321c may be implemented by using corresponding function modules. The following describes a possible implementation of the functions.

As shown in FIG. 6, a secure firmware enable layer 1321a includes a root of trust construction module 1a1 and a first measurement module 1a2. The root of trust construction module 1a1 is configured to construct a root of trust. The first measurement module 1a2 is configured to perform trusted measurement and trusted control on the secure firmware boot layer 1321b.

As shown in FIG. 6, the secure firmware boot layer 1321b includes a first boot module 1b1 and a second measurement module 1b2. The first boot module 1b1 is configured to boot a secure firmware function layer 1321c to enable. The second measurement module 1b2 is configured to perform trusted measurement and trusted control on the secure firmware function layer 1321c.

As shown in FIG. 6, a secure firmware function layer 1321c includes a trusted module service middleware 1c1 and a third measurement module 1c2. The cryptographic module service middleware 1c1 is configured to provide an application programming interface using the cryptographic module 115, that is, the trusted module service middleware 1c1 is configured to convert a function of the cryptographic module 115 into a driver, and provide a converted driver for each module of the secure firmware function layer 1321c in a form of an application programming interface. A third measure module 1c2 is configured to perform trusted measurement and trusted control on another to-be-measured object.

In a possible implementation, the secure firmware function layer 1321c can perform trusted measurement and trusted control on a plurality of to-be-measured objects. To ensure an implementation effect of trusted measurement and trusted control on different to-be-measured objects by the secure firmware function layer 1321c, a function of the third measurement module 1c2 may be implemented by using a plurality of sub-function modules.

For example, corresponding to a function that the secure firmware function layer 1321c is configured to perform trusted measurement and trusted control on the computing component 12, and when a to-be-measured object in the computing component 12 includes a configuration file of a CPLD, an image file of a BIOS 121, an image file of a first operating system kernel 122, an image file of a first operating system boot layer 123, and an image file of a business application 124. As shown in FIG. 6, the third measurement module 1c2 may include a CPLD measurement module 1c21, a CPLD control function module 1c22, a BIOS measurement module 1c23, a core trusted measurement and determining module 1c24, and a platform trusted control module 1c25. The CPLD measurement module 1c21 is configured to perform trusted measurement on the CPLD. The CPLD control function module 1c22 is configured to perform trusted control on the CPLD. The BIOS measurement module 1c23 is configured to perform trusted measurement on the BIOS 121. The core trusted measurement and determining module 1c24 is configured to perform trusted measurement on the first operating system kernel 122, the first operating system boot layer 123, and the business application 124. In addition, the core trusted measurement and determining module 1c24 is further configured to be responsible for a public affair in the secure firmware function layer 1321c. For example, the core trusted measurement and determining module 1c24 is further configured to receive respective to-be-measured objects sent by the CPLD measurement module 1c21, the CPLD control function module 1c22, and the BIOS measurement module 1c23, send the to-be-measured objects to the cryptographic module 115, receive metric values returned by the cryptographic module 115 based on the received to-be-measured objects, perform verification based on the metric values, generate a control command based on a verification result, and send the control command to the platform trusted control module 1c25. The platform trusted control module 1c25 is configured to perform, based on the control command, trusted control on a corresponding to-be-measured object that has been measured. The metric value is used for reflecting a degree of trust of the to-be-measured object. The to-be-measured object may include an image file (for example, a binary file) and/or a configuration file. For example, a to-be-measured object in the CPLD is the configuration file of the CPLD. A to-be-measured object in the first operating system kernel 122 is a binary file of the first operating system kernel 122.

In addition, as shown in FIG. 4, an out-of-band management component 132 further includes a second operating system boot layer 1322, a second operating system kernel layer 1323, and a trusted application layer 1324. The following separately describes the second operating system boot layer 1322, the second operating system kernel layer 1323, and the trusted application layer 1324.

In addition to a function of booting the second operating system kernel layer 1323, functions of the second operating system boot layer 1322 further include: Before the second operating system kernel layer 1323 is boot, trusted measurement is performed on the second operating system kernel layer 1323 based on the root of trust, and trusted control is performed on the second operating system kernel layer 1323 based on a measurement result of the second operating system kernel layer 1323, to control whether to enable the second operating system kernel layer 1323. When the trusted measurement on the second operating system kernel layer 1323 succeeds, the trusted control on the second operating system kernel layer 1323 includes allowing the out-of-band management chip 131 to load and execute the second operating system kernel layer 1323. When the trusted measurement on the second operating system kernel layer 1323 does not succeed, the trusted control on the second operating system kernel layer 1323 does not include allowing the out-of-band management chip 131 to load and execute the second operating system kernel layer 1323. An image file of the second operating system kernel layer 1323 is stored in a non-volatile flash memory outside the out-of-band management chip 131, for example, stored in the storage device having the hardware protection function.

In addition to the second operating system kernel layer 1323 implementing a function of the operating system kernel, the second operating system kernel 1323a is further configured to perform trusted measurement on the trusted application layer 1324 based on the root of trust, and perform trusted control on the trusted application layer 1324 based on a measurement result of the trusted application layer 1324. The trusted application layer 1324 includes one or more trusted applications. The trusted application is an application that is issued by an issuer and that is archived and managed when being issued. After the trusted application is downloaded to the out-of-band management chip 131, the second operating system kernel layer 1323 performs trusted measurement on the trusted application. When trusted measurement on the trusted application succeeds, trusted control on the trusted application includes allowing the trusted application to enter an installation, upgrade, or running process. When the trusted measurement on the trusted application does not succeed, the trusted control on the trusted application does not include allowing the trusted application to enter the installation, upgrade, or running process.

Figure 7:
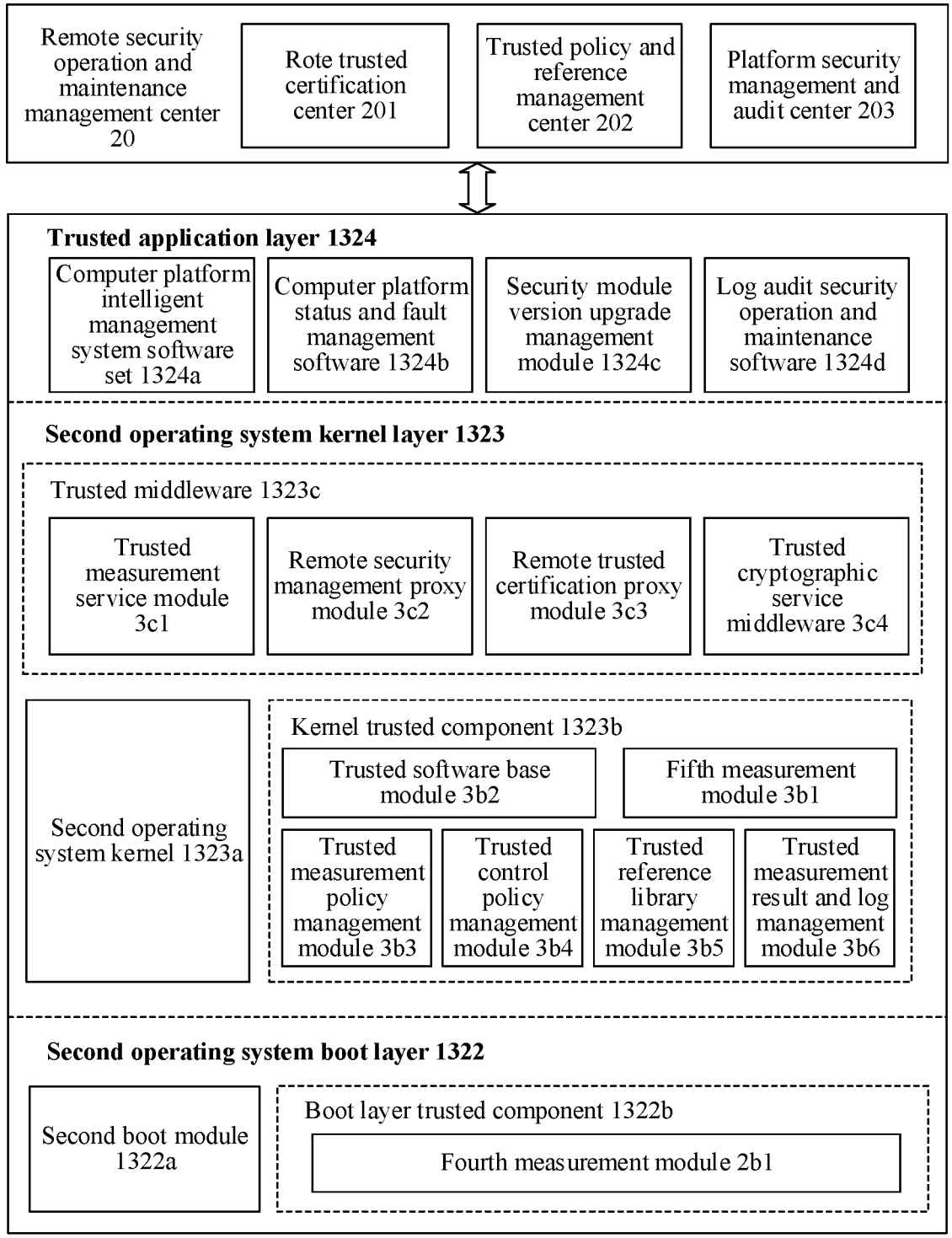
FIG. 7 is a schematic structural diagram of still another computer system according to an embodiment of the present application.

The trusted application layer 1324 is configured to receive an out-of-band management signal outside the computer system, and provide an operation and maintenance service and/or a security service based on the out-of-band management signal. As shown in FIG. 7, the trusted application layer 1324 includes one or more of the following trusted applications: a computer platform intelligent management system software set 1324*a*, a computer platform status and fault management software 1324*b*, a security module version upgrade management module 1324*c*, and a log audit security operation and maintenance software 1324*d*. The computer platform intelligent management system software set 1324*a* is a general term for out-of-band management and operation and maintenance software. The computer platform status and the fault management software 1324*b* is software that performs state indication and fault processing on the computer platform by sensing information about physical states such as power supply and temperature of the computer platform. The security module version upgrade management module 1324*c* is application software that performs version upgrade management on the secure firmware 1321 and a configuration file of a CPLD in a computing component 12, a binary file of a BIOS 121, a binary file of a first operating system boot layer 123, and the like. A function of the log audit security operation and maintenance software 1324*d* is software that audits a log file generated in a running process of a trusted function component 13 and executes a corresponding processing measure based on an instruction of the log information.

It should be noted that, corresponding to an out-of-band management component 132 further including a second operating system boot layer 1322, the secure firmware 1321 is further configured to perform trusted measurement on the second operating system boot layer 1322 based on the root of trust, and perform trusted control on the second operating system boot layer 1322 based on a measurement result of the second operating system boot layer 1322. When the trusted measurement on the second operating system boot layer 1322 succeeds, the trusted control on the second operating system boot layer 1322 includes allowing an out-of-band management chip 131 to load and execute the second operating system boot layer 1322. When the trusted measurement on the second operating system boot layer 1322 does not succeed, the trusted control on the second operating system boot layer 1322 does not include allowing the out-of-band management chip 131 to load and execute the second operating system boot layer 1322. An image file of the second operating system boot layer 1322 is stored in a non-volatile flash memory outside the out-of-band management chip 131, for example, stored in a storage device having a hardware protection function.

In addition, corresponding to an implementation in which a third measurement module 1*c*2 in the secure firmware function layer 1321*c* is implemented by using a sub-function module. As shown in FIG. 6, the third measurement module 1*c*2 further includes a second operating system boot layer measurement module 1*c*26 and a second operating system kernel measurement module 1*c*27. The second operating system boot layer measurement module 1*c*26 is configured to perform trusted measurement on the second operating system boot layer 1322. The second operating system kernel measurement module 1*c*27 is configured to perform trusted measurement on the second operating system kernel. Correspondingly, the core trusted measurement and determining module 1*c*24 is further configured to receive to-be-measured objects sent by the second operating system boot layer measurement module 1*c*26 and the second operating system kernel measurement module 1*c*27, send the to-be-measured objects to the cryptographic module 115, receive the metric values returned by the cryptographic module 115 based on the received to-be-measured objects, perform verification based on the metric values, generate a control command based on a verification result, and send the control command to the platform trusted control module 1*c*25. The platform trusted control module 1*c*25 is further configured to perform trusted control on a corresponding to-be-measured object based on the control command.

In a possible implementation, as shown in FIG. 4, the second operating system boot layer 1322 includes a second boot module 1322*a* and a boot layer trusted component 1322*b*. The second boot module 1322*a* is configured to boot the second operating system kernel layer 1323 to enable. A function of the second boot module 1322*a* may be implemented by using standard open source Linux universal boot loader (U-Boot) code. As shown in FIG. 7, a boot layer trusted component 1322*b* includes a fourth measurement module 2*b*1. The fourth measurement module 2*b*1 is configured to perform trusted measurement on a second operating system kernel layer 1323 based on the root of trust, and perform trusted control on the second operating system kernel layer 1323 based on a measurement result of the second operating system kernel layer 1323.

As shown in FIG. 4, the second operating system kernel layer 1323 includes a second operating system kernel 1323*a* and a kernel trusted component 1323*b*. The second operating system kernel 1323*a* is configured to implement a function of the operating system kernel in the trusted function component 13. A function of the second operating system kernel 1323*a* may be implemented by using the standard open source Linux operating system kernel code. As shown in FIG. 7, the kernel trusted component 1323*b* includes a fifth measurement module 3*b*1. The fifth measurement module 3*b*1 is configured to perform trusted measurement on the trusted application layer 1324 based on the root of trust, and perform trusted control on the trusted application layer 1324 based on a measurement result of the trusted application layer 1324.

Optionally, as shown in FIG. 7, the kernel trusted component 1323*b* further includes a trusted software base module 3*b*2. The trusted software base module 3*b*2 is configured to obtain a trusted model of at least one to-be-measured object in a first operating system kernel and an application in the computing component, and a second operating system kernel and a trusted application in the trusted function component 13, and cooperate with the fifth measurement module 3*b*1 to perform trusted measurement on any one of the at least one to-be-measured object based on a trusted model of the any to-be-measured object. The trusted model of the to-be-measured object is used for reflecting a degree of trust of the to-be-measured object, and the trusted model includes a metric value of the to-be-measured object and one or more other parameters. By deploying the trusted software base module 3*b*2 in the trusted function component 13, running security of the second operating system can be further ensured, and security of a computer maintained by the trusted software base module 3*b*2 can be further ensured.

Another parameters and a metric value are used for jointly reflecting the degree of trust of the to-be-measured object. The trusted software base module 3*b*2 may obtain a to-be-measured object, and perform modeling based on the to-be-measured object, to obtain a trusted model of the to-bemeasured object. In a possible implementation, the metric value may be obtained by the cryptographic module 115 by invoking an SM3 state cryptographic algorithm service based on the to-be-measured object.

The trusted model of the to-be-measured object is obtained by the trusted software base module 3b2, and trusted measurement is performed on the to-be-measured object based on the trusted model. Because the trusted model includes a metric value and one or more other parameters, a degree of trust of the to-be-measured object can be reflected from multiple dimensions, thereby improving accuracy of describing the degree of trust of the to-be-measured object. When trusted measurement is performed on the to-be-measured object based on the trusted model, security of the to-be-measured object is improved.

By performing a trusted measurement and trusted control inside the trusted function component 13, trusted measurement and trusted control can be performed in a loading phase, an enabling phase, and a running phase of executable code running in the trusted function component 13, thereby ensuring validity and integrity of firmware and software code during loading, enabling, and running, ensuring that firmware and software components running on the out-of-band management chip 131 are not tampered with or implanted with malicious code, and further ensuring security of the computer.

As shown in FIG. 7, the kernel trusted component 1323b further includes one or more of the following: a trusted measurement policy management module 3b3, a trusted control policy management module 3b4, a trusted reference library management module 3b5, and a trusted measurement result and log management module 3b6. The following separately describes the modules.

The trusted measurement policy management module 3b3 is configured to manage a measurement policy used in a trusted measurement process, and provide a measurement policy for a measurement subject, where the measurement subject is configured to perform trusted measurement on the to-be-measured object. In addition, corresponding to the kernel trusted component 1323b including the trusted software base module 3b2, the trusted measurement policy management module 3b3 is further configured to provide an interaction interface for interacting with the trusted software base module 3b2.

The management of the measurement policy by the trusted measurement policy management module 3b3 includes performing loading enabling, version upgrade, and fault rollback on the measurement policy. The measurement policy indicates information such as a to-be-measured object on which trusted measurement is performed and a measurement method used. The measurement method indicates a setting manner of the to-be-measured object, an occasion of the trusted measurement, and a cryptographic algorithm used by the trusted measurement, and the like. The to-be-measured object may include program code, data, behavior, and the like.

The trusted control policy management module 3b4 is configured to manage a control policy used for controlling the to-be-measured object based on a measurement result, and provide the control policy for a measurement subject. In addition, corresponding to the kernel trusted component 1323b including the trusted software base module 3b2, the trusted control policy management module 3b4 is further configured to provide the interaction interface for interacting with the trusted software base module 3b2.

The management of the control policy by the trusted control policy management module 3b4 includes performing loading enabling, version upgrade, and fault rollback on the control policy. The control policy indicates a control object (that is, a to-be-measured object to which a measurement result belongs) and a control range of trusted control, a state that is achieved by the control object through trusted control, a manner of responding to the control object based on the trusted control, and determining an execution effect of the trusted control based on a response of the control object.

The trusted reference library management module 3b5 is configured to manage a measurement reference used for making a comparison with the metric value of the to-be-measured object in the trusted measurement process, and provide the measurement reference for the measurement subject. The management of the measurement reference by the trusted reference library management module 3b5 includes performing registration, loading enabling, version upgrade, and fault rollback on the measurement reference. In addition, corresponding to the kernel trusted component 1323b including the trusted software base module 3b2, the trusted reference library management module 3b5 is further configured to provide the interaction interface for interacting with the trusted software base module 3b2.

The trusted measurement result and log management module 3b6 is configured to record the trusted measurement result and information used for reflecting the trusted measurement process. The information used for reflecting the trusted measurement process includes the to-be-measured object. The trusted measurement result includes log content such as information such as a metric value generated by the cryptographic module 115 based on the to-be-measured object and a verification result of verifying the metric value. In addition, the trusted measurement result and log management module 3b6 is further configured to provide another module with a functional interface configured to manage the measurement result and audit a log.

As shown in FIG. 4, the second operating system kernel layer 1323 further includes trusted middleware 1323c. The trusted middleware 1323c is configured to provide a service for the trusted application layer 1324. An image file of the trusted middleware 1323c is stored in a non-volatile flash memory outside the out-of-band management chip 131, for example, stored in the storage device having the hardware protection function.

Corresponding to the second operating system kernel layer 1323 further including the trusted middleware 1323c, in the trusted function component 13, the trusted middleware 1323c is deployed between the second operating system kernel 1323a and the trusted application layer 1324. A function of performing trusted measurement on the trusted application layer 1324 based on the root of trust included in the second operating system kernel layer 1323 is implemented by the trusted middleware 1323c to perform trusted measurement on the root of trust on the trusted application layer 1324. In addition, the second operating system kernel layer 1323 is further configured to perform trusted measurement on the trusted middleware 1323c based on the root of trust, and perform trusted control on the trusted middleware 1323c based on a measurement result of the trusted middleware 1323c. When the trusted measurement on the trusted middleware 1323c succeeds, trusted control on the trusted middleware 1323c includes allowing the out-of-band management chip 131 to load and execute the trusted middleware 1323c. When the trusted measurement on the trusted middleware 1323c does not succeed, the trusted control on the trusted middleware 1323c does not include allowing the out-of-band management chip 131 to load and execute the trusted middleware 1323c.

In a possible implementation, as shown in FIG. 7, trusted middleware 1323c includes a trusted measurement service module 3c1. In this case, a process in which the second operating system kernel layer 1323 performs trusted measurement on the trusted application layer 1324 based on the root of trust is implemented by the trusted measurement service module 3c1 to perform trusted measurement on the trusted application layer 1324 based on the root of trust.

Further, as shown in FIG. 7, the trusted middleware 1323c further includes one or more of the following: a remote security management proxy module 3c2, a remote trusted certification proxy module 3c3, and trusted cryptographic service middleware 3c4. The remote security management proxy module 3c2 is configured to provide a remote security management service for the trusted function component 13 based on a connection to a remote security operation and maintenance management center 20. The remote trusted certification proxy module 3c3 is configured to provide a remote trusted certification service for the trusted function component 13 based on the connection to the remote security operation and maintenance management center 20. The trusted cryptographic service middleware 3c4 is configured to provide, for the computing component 12 and the trusted function component 13, an application programming interface used for using the cryptographic module.

It should be noted that the second operating system kernel layer 1323 further includes an eMMC interface driver module, a PCIe bus interface driver module, and a DDR memory interface driver module. For implementations and functions of the eMMC interface driver module, the PCIe bus interface driver module, and the DDR memory interface driver module, refer to the foregoing content. Details are not described herein again.

Corresponding to the second operating system boot layer 1322 further including a boot layer trusted component 1322b, the second operating system kernel layer 1323 further including a kernel trusted component 1323b and the trusted middleware 1323c, the security module version upgrade management module 1324c in the trusted application layer 1324 is further configured to perform version upgrade management on the boot layer trusted component 1322b, the kernel trusted component 1323b, and the trusted middleware 1323c.

In the embodiment of the present application, an out-of-band management chip 131 includes a security core, and the security core can access all security domains in the out-of-band management chip 131. In a possible implementation, a secure firmware 1321 is run by a security core. For example, a secure firmware enable layer 1321a, a secure firmware boot layer 1321b, and a secure firmware function layer 1321c are all run by the security core, to further ensure security of the secure firmware enable layer 1321a, the secure firmware boot layer 1321b, and the secure firmware function layer 1321c.

The security core runs the secure firmware 1321, so that a physical isolation advantage of the security core can be used, and a component running in a performance domain environment does not have a basis for performing an unauthorized operation on a security domain, thereby implementing isolation protection on the secure firmware 1321, and ensuring better security of the computer.

Further, the out-of-band management chip 131 further includes a performance core, the security core is deployed in the security domain, and the performance core is deployed in the performance domain. The performance domain and the security domain are isolated so that the performance domain cannot directly access the security domain. Communication between the performance core and the security core needs to be implemented by using an inter-core communication mechanism. The performance domain includes a performance core and all hardware resources whose security attribute is the performance domain. The performance domain performance core is enabled and controlled by the security domain in the security core, and may run operating system software.

In a possible implementation, the out-of-band management chip 131 has a performance core, and the performance core is configured to run a second operating system. For example, a second operating system boot layer 1322, a second operating system kernel layer 1323, and a trusted application layer 1324 may be run by the performance core.

Because a cryptographic module 115 is a security device, a component running by the performance core cannot directly use the cryptographic module 115, and an interaction between the performance core and the cryptographic module 115 needs to be implemented by using a security core. In a possible implementation, an inter-core communication mechanism between a security core and a performance core may be implemented by using an interaction interface. Interaction between the foregoing component running in the performance core and the component running in the security core may be implemented by using the interaction interface. In this case, a function of the secure firmware function layer 1321c, a function of the second operating system boot layer 1322, a function of the second operating system kernel layer 1323, and a function of the trusted middleware 1323c further include an interaction interface driver configured to implement communication between the security core and the performance core.

Optionally, as shown in FIG. 4, the computer system provided in the embodiment of the present application further includes a remote security operation and maintenance management center 20, and the computer may be connected to the remote security operation and maintenance management center 20 by using a trusted network. The remote security operation and maintenance management center 20 is a function set that performs remote centralized management and intelligent operation and maintenance on a security and trust feature of the computer. In addition, when the computer further has a remote operation and maintenance management center, the remote security operation and maintenance management center 20 may be deployed in an isolated manner from the remote operation and maintenance management center of the computer, so as to meet an isolated deployment requirement. For example, the remote security operation and maintenance management center 20 and the remote operation and maintenance management center of the computer may be deployed and run in different isolation domains of the same server system, or may be separately deployed in independent server systems of different security attribute isolation domains, and the remote security operation and maintenance management center 20 is connected to the remote operation and maintenance management center of the computer by using a trusted network connection architecture.

As shown in FIG. 7, the remote security operation and maintenance management center 20 may include one or more of the following: a remote trusted certification center 201, a trusted policy and reference management center 202, and a platform security management and audit center 203. The remote trusted certification center 201 is configured to provide a trusted challenge and a remote trusted certification service for a computer. The trusted policy and reference management center 202 is a centralized management end of a trusted measurement policy, a trusted control policy, and a trusted reference library in the computer, and can implement services such as remote delivery, update management, version audit, and fault recovery of the trusted policy and the trusted reference library. The platform security management and audit center 203 is configured to provide a remote connection interface, firmware and software upgrade management and version management functions, a platform key management function, a trusted measurement result visualization interface function, and a trusted log audit function for the boot layer trusted component.

The remote security management proxy module 3c2 and the remote trusted certification proxy module 3c3 in the trusted middleware 1323c are configured to cooperate with the remote security operation and maintenance management center 20. For example, the trusted application may be software that is issued by the remote security operation and maintenance management center 20 and archived and managed during issuance, and the trusted application may be delivered by the remote security operation and maintenance management center 20 to the remote security management proxy module 3c2 by using a trusted network. The remote security management proxy module 3c2 performs trusted measurement on the trusted application, and allows the trusted application to enter an installation and running process when the trusted measurement passes. When the trusted measurement does not pass, the trusted application is not allowed to enter the installation and running process, and a trusted measurement failure may be fed back to the remote security operation and maintenance management center 20, so as to prompt an administrator to determine a trusted firmware and an upgrade deployment behavior. In addition, when the remote security operation and maintenance management center 20 is further deployed, the second operating system boot layer 1322 is further configured to establish a network interface controller driver and a middleware, so as to establish a secure connection between the trusted function component 13 and the remote security operation and maintenance management center 20.

By configuring the remote security operation and maintenance management center 20 for the computer, the computer provided in the embodiment of the present application can cooperate with the remote security operation and maintenance management center 20 to provide a rich security operation and maintenance management capability and a remote trusted certification service capability, so as to establish a trusted measurement subject and a trusted software execution environment in the trusted function component 13 of the computer system.

In conclusion, in the computer system provided in embodiments of the present application, the root of trust is constructed in the out-of-band management chip. Because the out-of-band management chip has a feature of more secure hardware, security of the constructed root of trust can be ensured. In addition, trusted measurement and trusted control are performed on the computing component and the trusted function component based on the root of trust, so that security of trusted measurement and trusted control can be ensured. In addition, trusted measurement and trusted control are performed on the to-be-measured object in the running and enabling phases, so that a trusted protection capability provided in the embodiment of the present application can cover the running and enabling phases of the computing component and the trusted function component.

In addition, when the out-of-band management chip in the embodiment of the present application is a BMC, a physical isolation advantage of the security core of the BMC may be used, so that complete and stable isolation protection can be performed on the computer and has a higher security protection capability compared with a related technology.

An embodiment of the present application further provides a method for running a computer system. The method can be applied to the computer system provided in the embodiment of the present application. For implementations of the computer system, refer to related content in the foregoing description. Details are not described herein again. The method for running a computer system includes: An out-of-band management chip of the computer system runs secure firmware, constructs a root of trust in the out-of-band management chip, performs trusted measurement on a computing component of the computer system based on the root of trust, and controls the computing component based on a trusted measurement result. The computing component performs, based on control of the out-of-band management chip, an operation indicated by the control.

In the method for running a computer system, the root of trust is constructed in the out-of-band management chip. Because the out-of-band management chip has a feature of more secure hardware, security of the constructed root of trust can be ensured. In addition, trusted measurement and control are performed on the computing component and the trusted function component based on the root of trust, so that security of trusted measurement and control can be ensured.

Figure 8:
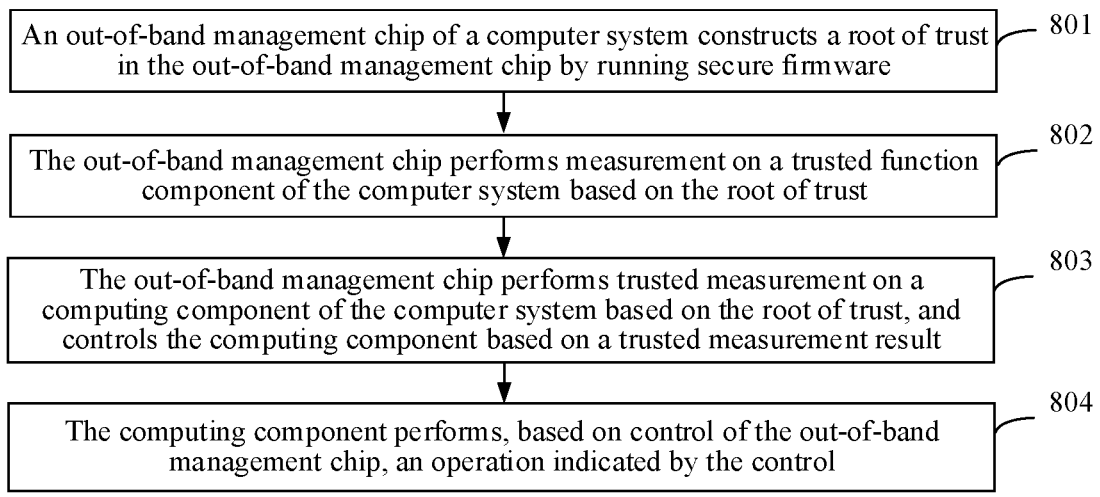
FIG. 8 is a flowchart of a method for running a computer system according to an embodiment of the present application.

FIG. 8 is a flowchart of a method for running a computer system according to an embodiment of the present application. As shown in FIG. 8, the method includes the following steps.

Step 801: An out-of-band management chip of a computer system constructs a root of trust in the out-of-band management chip by running secure firmware.

The security core is further configured to construct the root of trust in the security core by running the secure firmware. Further, the secure firmware includes a secure firmware enable layer, and the out-of-band management chip may construct the root of trust in the out-of-band management chip by running the secure firmware enable layer.

In a possible implementation, a core root of trust for measurement configured to construct the root of trust is stored in a read-only memory of the out-of-band management chip.

Step 802: The out-of-band management chip performs a measurement on the trusted function component of the computer system based on the root of trust.

The secure firmware includes the secure firmware enable layer, the secure firmware boot layer, and the secure firmware function layer. To further improve security of the computer, trusted measurement and control can also be performed on the trusted function component. Correspondingly, an implementation process of step 802 includes: The secure firmware enable layer performs trusted measurement on the secure firmware boot layer based on the root of trust, and controls the secure firmware boot layer based on a measurement result of the secure firmware boot layer. The secure firmware boot layer performs trusted measurement on the secure firmware function layer based on the root of trust, and controls the secure firmware function layer based on a measurement result of the secure firmware function layer. The secure firmware function layer performs trusted measurement on another to-be-measured object, and controls the another to-be-measured object based on a trusted measurement result of the another to-be-measured object. And the another to-be-measured object includes a to-be-measured object other than the secure firmware in the computer system.

In a possible implementation, the out-of-band management chip has a security core, and the security core is further configured to run the secure firmware enable layer, the secure firmware boot layer, and the secure firmware function layer.

In addition, the out-of-band management chip further has a performance core, and the performance core is configured to run a second operating system. For example, the out-of-band management chip runs a second operating system boot layer, a second operating system kernel layer, and a trusted application layer of the computer system. In this case, step 802 further includes the following steps. The secure firmware performs trusted measurement on the second operating system boot layer based on the root of trust, and controls the second operating system boot layer based on a measurement result of the second operating system boot layer. The second operating system boot layer performs trusted measurement on the second operating system kernel layer based on the root of trust, and controls the second operating system kernel layer based on a measurement result of the second operating system kernel layer. The second operating system kernel layer performs trusted measurement on a trusted application layer based on the root of trust, and controls the trusted application layer based on a measurement result of the trusted application layer. The trusted application layer is configured to receive an out-of-band management signal outside the computer system, and provide an operation and maintenance service and/or a security service based on the out-of-band management signal.

Optionally, the second operating system kernel layer includes a trusted software base module. In this case, an implementation process of step 802 further includes: The trusted software base module obtains a trusted model of at least one to-be-measured object among a first operating system kernel and an application of the computing component, and a second operating system kernel and trusted application software in the trusted function component, and performs trusted measurement on the any to-be-measured object based on the trusted model of any to-be-measured object. The trusted model of the to-be-measured object is used for reflecting a degree of trust of the to-be-measured object, and the trusted model includes a metric value of the to-be-measured object and another parameter.

In addition, the second operating system kernel layer further includes one or more of the following: a trusted measurement policy management module, a trusted control policy management module, a trusted reference library management module, and a trusted measurement result and log management module. In this case, the method further includes one or more of the following operations: The trusted measurement policy management module manages a measurement policy used in a trusted measurement process, and provides the measurement policy for a measurement subject, where the measurement subject is configured to perform trusted measurement on the to-be-measured object. The trusted control policy management module manages a control policy used for controlling the to-be-measured object based on a measurement result, and provides the control policy for the measurement subject. The trusted reference library management module manages a measurement reference used for making a comparison with the metric value of the to-be-measured object in the trusted measurement process, and provides the measurement reference for the measurement subject. The trusted measurement result and log management module records the trusted measurement result and information used for reflecting the trusted measurement process.

Further, the second operating system kernel layer further includes trusted middleware. The trusted middleware includes a trusted measurement service module. Correspondingly, a function of the second operating system kernel layer to perform trusted measurement on the trusted application layer based on the root of trust is implemented by the trusted measurement service module to perform trusted measurement on the trusted application layer based on the root of trust. In addition, an implementation process of step 802 further includes: The second operating system kernel layer performs trusted measurement on the trusted middleware based on the root of trust, and controls the trusted middleware based on a measurement result of the trusted middleware.

Optionally, the trusted middleware further includes one or more of the following: a remote security management proxy module, a remote trusted certification proxy module, and trusted cryptographic service middleware. Correspondingly, the implementation process of step 802 further includes one or more of the following operations. The remote security management proxy module provides a remote security management service for the trusted function component based on a connection to the remote security operation and maintenance management center. The remote trusted certification proxy module provides a remote trusted certification service for the trusted function component based on the connection to the remote security operation and maintenance management center. The trusted cryptographic service middleware provides, for the computing component and the trusted function component, an application programming interface used for using the cryptographic module.

Step 803: The out-of-band management chip performs trusted measurement on the computing component of the computer system based on the root of trust, and controls the computing component based on a trusted measurement result.

In a possible implementation, the secure firmware is further configured to perform trusted measurement on the computing component, and control the computing component based on a trusted measurement result of the computing component. In addition, the secure firmware may perform trusted measurement on the at least two to-be-measured objects in the computing component, and control any one of the at least two to-be-measured objects based on a trusted measurement result of the any to-be-measured object. The to-be-measured object in the computing component includes an image file of a basic input/output apparatus, an image file of a first operating system kernel, an image file of a first operating system boot layer, and an image file of a business application. Optionally, the to-be-measured object in the computing component further includes a configuration file of a complex programmable logic device.

Step 804: The computing component performs, based on control of the out-of-band management chip, an operation indicated by the control.

The trusted measurement includes trusted measurement performed during running of the to-be-measured object and trusted measurement performed in a phase of enabling the to-be-measured object. When trusted measurement is performed during running of the to-be-measured object, control indicates whether the to-be-measured object continues to be run. When trusted measurement is performed in the phase of enabling the to-be-measured object, the control indicates whether the to-be-measured object is enabled.

In conclusion, in the computer system running method provided in embodiments of the present application, the root of trust is constructed in the out-of-band management chip. Because the out-of-band management chip has a feature of more secure hardware, security of the constructed root of trust can be ensured. In addition, trusted measurement and trusted control are performed on the computing component and the trusted function component based on the root of trust, so that security of trusted measurement and trusted control can be ensured. In addition, trusted measurement and trusted control are performed on the to-be-measured object in the running and enabling phases, so that a trusted protection capability provided in the embodiment of the present application can cover the running and enabling phases of the computing component and the trusted function component.

In addition, when the out-of-band management chip in the embodiment of the present application is a BMC, a physical isolation advantage of the security core of the BMC may be used, so that complete and stable isolation protection can be performed on the computer and has a higher security protection capability compared with a related technology.

An embodiment of the present application further provides a method for running a trusted function component of a computer system. The trusted function component includes a BMC chip. The method includes: The BMC chip constructs a root of trust in the BMC chip by running a secure firmware function layer of a computer, performs trusted measurement on at least one to-be-measured object in a computing component of the computer system, and controls any one of the at least one to-be-measured object based on a trusted measurement result of the any to-be-measured object.

The at least one to-be-measured object includes one or more of the following: a configuration file of a complex programmable logic device, an image file of a basic input/output apparatus, an image file of a first operating system kernel, an image file of a first operating system boot layer, and an image file of a business application.

In the method for running a trusted function component of a computer system, the root of trust is constructed in the BMC chip. Because the BMC chip has a feature of more secure hardware, security of the constructed root of trust can be ensured. In addition, trusted measurement and control are performed on the computing component and the trusted function component based on the root of trust, so that security of trusted measurement and control can be ensured.

In addition, the secure firmware function layer is used to perform trusted measurement and trusted control on the at least one to-be-measured object in the computing component. Compared with a trusted measurement and a trusted control process of the to-be-measured object in the computing component in a related technology, a measurement subject can be centralized on the secure firmware function layer as much as possible, so that the to-be-measured object can be as close to the root of trust as possible, and a problem that identities of the measurement subject and the to-be-measured object are confused and a boundary between a trusted domain and an untrusted domain is blurred caused by a reason that the measurement subject in the computing component is also a to-be-measured object can be solved, this can further ensure security of the computing component.

An embodiment of the present application further provides a method for running a trusted function component of a computer system. The trusted function component includes a BMC chip, and the BMC chip includes a security core and a performance core. The method includes: The security core constructs a root of trust in the BMC chip by running a secure firmware enable layer, performs trusted measurement on the trusted function component and a computing component of the computer system, and controls a to-be-measured object based on a trusted measurement result of the to-be-measured object.

The to-be-measured object includes one or more of the following: an image file of a secure firmware boot layer, an image file of a secure firmware function layer, an image file of a second operating system boot layer, an image file of a second operating system kernel layer, and an image file of a trusted application layer, and a configuration file of a complex programmable logic device, an image file of a basic input/output apparatus, an image file of a first operating system kernel, an image file of a first operating system boot layer, and an image file of a business application in a computing component. The secure firmware boot layer and the secure firmware function layer are configured to be run by the security core, and the second operating system boot layer, the second operating system kernel layer, and the trusted application layer are configured to be run by the performance core.

In a possible implementation, a process in which the BMC chip performs a trusted measurement includes the following processes:

The secure firmware enable layer performs trusted measurement on the secure firmware boot layer based on the root of trust constructed in the BMC chip, and controls the secure firmware boot layer based on a measurement result of the secure firmware boot layer.

The secure firmware boot layer performs trusted measurement on the secure firmware function layer based on the root of trust, and controls the secure firmware function layer based on a measurement result of the secure firmware function layer.

The secure firmware function layer performs trusted measurement on the second operating system boot layer, and controls the second operating system boot layer based on a trusted measurement result of the second operating system boot layer.

The second operating system boot layer performs trusted measurement on the second operating system kernel layer based on the root of trust, and controls the second operating system kernel layer based on a measurement result of the second operating system kernel layer.

The second operating system kernel layer performs trusted measurement on a trusted application layer based on the root of trust, and controls the trusted application layer based on a measurement result of the trusted application layer.

The trusted application layer receives an out-of-band management signal outside the computer system, and provides an operation and maintenance service and/or a security service based on the out-of-band management signal.

In the method for running a computer system, the root of trust is constructed in the BMC chip. Because the BMC chip has a feature of more secure hardware, security of the constructed root of trust can be ensured. In addition, trusted measurement and control are performed on the computing component and the trusted function component based on the root of trust, so that security of trusted measurement and control can be ensured.

In addition, by using the physical isolation advantage of the security core of the BMC, the complete and stable isolation protection can be performed on the computer and has a higher security protection capability compared with a related technology In addition, the secure firmware function layer is used to perform trusted measurement and trusted control on the at least one to-be-measured object in the computing component. Compared with a trusted measurement and trusted control process of the to-be-measured object in the computing component in the related technology, a measurement subject can be centralized on the secure firmware function layer as much as possible, so that the to-be-measured object can be as close to the root of trust as possible, and a problem that identities of the measurement subject and the to-be-measured object are confused and a boundary between a trusted domain and an untrusted domain is blurred caused by a reason that the measurement subject in the computing component is also a to-be-measured object can be solved, this can further ensure security of the computing component.

The present disclosure further provides a method for running a computer system. The method includes: A remote security operation and maintenance management center of the computer system provides a remote centralized management service and an operation and maintenance service for a trusted function component provided in the embodiment of the present application.

In a possible implementation, the remote security operation and maintenance management center provides a remote centralized management service and an operation and maintenance service, including one or more of the following:

The remote trusted certification center provides a trusted challenge and a remote trusted certification service for the computer.

A trusted policy and reference management center manages a trusted measurement policy, a trusted control policy and a trusted reference library in the computer.

In addition, a platform security management and audit center provides a remote connection interface, provides a trusted measurement result visualization interface function, and provides a trusted log audit function for a boot layer trusted component in the computer.

The remote security operation and maintenance management center provides a remote centralized management service and an operation and maintenance service, so that the computer provided in the embodiment of the present application can cooperate with the remote security operation and maintenance management center to provide a rich security operation and maintenance management capability and a remote trusted certification service capability, so that a trusted and comprehensive measurement subject and a trusted software execution environment are established in a trusted function component of the computer system.

It may be clearly understood by a person skilled in the art that, for the purpose of convenient and brief description, for an implementation process of the foregoing methods, refer to corresponding content in the foregoing content. Details are not described herein again.

An embodiment of the present application provides a computer. The computer includes a hardware platform, and the hardware platform includes a processor, a memory, a communication interface, a bus, a cryptographic module, and the like. The processor, the communication interface, the memory, and the cryptographic module are connected to each other by using the bus. A computer program is stored in a memory. When the processor executes the computer program, a computer device implements the method provided in the embodiment of the present application. For an implementation and a structure of the computer, refer to corresponding content in the foregoing content in embodiments of the present application.

The present disclosure further provides a computer-readable storage medium. The computer-readable storage medium may be a non-transitory readable storage medium. When instructions in the computer-readable storage medium are executed by the computer, the computer is configured to perform the method provided in the present application. The computer-readable storage medium may be any usable medium accessible by the computer, or a data storage device including, for example, a server or a data center integrated with one or more usable media. The usable medium may be a magnetic medium (for example, a floppy disk, a hard disk drive, or a magnetic tape), an optical medium (for example, a digital video disc (DVD)), or a semiconductor medium (for example, an SSD).

The present disclosure further provides a computer program product. The computer program product includes a computer instruction. When being executed by a computer device, the computer device performs the method provided in embodiments of the present application.

A person of ordinary skill in the art may understand that all or some of the steps of embodiments may be implemented by hardware or a program instructing related hardware. The program may be stored in a computer-readable storage medium. The storage medium may include a read-only memory, a magnetic disk, or an optical disc.

In embodiments of the present application, the terms "first", "second", and "third" are merely used for description, but cannot be understood as an indication or implication of relative importance. The term "at least one" means one or more, and the term "a plurality of" means two or more, unless otherwise expressly limited.

The term "and/or" in the present application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are merely optional embodiments of the present application, but are not intended to limit the present application. Any modification, equivalent replacement, or improvement made without departing from the concept and principle of the present application should fall within the protection scope of the present application.

What is claimed is:

1. A computer system comprising:
    a computing component; and
    a trusted function component comprising an out-of-band management chip,
    wherein the out-of-band management chip is configured to:
        run secure firmware to construct a root of trust in the out-of-band management chip,
        perform a first trusted measurement on the computing component based on the root of trust to produce a first trusted measurement result, and
        control the computing component based on the first trusted measurement result,
    wherein the computing component is configured to perform, under the control of the out-of-band management chip, an operation indicated by the out-of-band management chip,
    wherein the out-of-band management chip comprises a performance core configured to run an operating system boot layer, an operating system kernel layer, and a trusted application layer, wherein the operating system kernel layer is configured to perform a second trusted measurement on the trusted application layer based on the root of trust to produce a second trusted measurement result, and control the trusted application layer based on the second trusted measurement result, and wherein the trusted application layer is configured to receive an out-of-band management signal outside the computer system, and provide at least one of an operation and maintenance service or a security service based on the out-of-band management signal.

2. The computer system of claim 1, wherein the out-of-band management chip comprises a security core configured to run the secure firmware to construct the root of trust.

3. The computer system of claim 1, wherein the out-of-band management chip comprises a read-only memory (ROM) configured to store a core root of trust for measurement (CRTM), and wherein the CRTM is configured to construct the root of trust.

4. The computer system of claim 1, wherein the secure firmware is configured to:
perform the first trusted measurement on the computing component; and
control the computing component based on the first trusted measurement result.

5. The computer system of claim 4, wherein the secure firmware is further configured to:
perform a third trusted measurement on at least two to-be-measured objects in the computing component to produce a third trusted measurement result; and
control one of the at least two to-be-measured objects based on the third trusted measurement result, wherein the one of the at least two to-be-measured objects in the computing component comprises a first image file of a basic input/output apparatus, a second image file of an operating system kernel, a third image file of the operating system boot layer, and a fourth image file of a business application.

6. The computer system of claim 5, wherein the at least two to-be-measured objects in the computing component further comprises a configuration file of a complex programmable logic device.

7. The computer system of claim 1, wherein the secure firmware comprises a secure firmware enable layer, a secure firmware boot layer, and a secure firmware function layer, wherein the out-of-band management chip is further configured to run the secure firmware enable layer and construct the root of trust, wherein the secure firmware enable layer is configured to perform a second trusted measurement on the secure firmware boot layer based on the root of trust and control the secure firmware boot layer based on a first measurement result of the secure firmware boot layer, wherein the secure firmware boot layer is configured to perform a third trusted measurement on the secure firmware function layer based on the root of trust and control the secure firmware function layer based on a second measurement result of the secure firmware function layer, wherein the secure firmware function layer is configured to perform a fourth trusted measurement on another to-be-measured object and control the another to-be-measured object based on a second trusted measurement result of the another to-be-measured object, and wherein the another to-be-measured object comprises a to-be-measured object other than the secure firmware in the computer system.

8. The computer system of claim 7, wherein the out-of-band management chip comprises a security core configured to run the secure firmware enable layer, the secure firmware boot layer, and the secure firmware function layer.

9. The computer system of claim 1, wherein the secure firmware is further configured to:
perform a third trusted measurement on the operating system boot layer based on the root of trust to produce a third trusted measurement result; and
control the operating system boot layer based on the third trusted measurement result.

10. The computer system of claim 9, wherein the operating system boot layer is configured to perform a fourth trusted measurement on the operating system kernel layer based on the root of trust to produce a fourth trusted measurement result, and control the operating system kernel layer based on the fourth trusted measurement result.

11. The computer system of claim 10, wherein the second operating system kernel layer comprises a trusted software base component configured to:
obtain a trusted model of at least one to-be-measured object, wherein the at least one to-be-measured object is in an operating system kernel and an application in the computing component, or wherein the at least one to-be-measured object is in the operating system kernel and a trusted application software in the trusted function component; and
perform a fifth trusted measurement on any of the at least one to-be-measured object based on the trusted model, wherein the trusted model is used for reflecting a degree of trust of the any of the at least one to-be-measured object, and wherein the trusted model comprises a metric value of the any of the at least one to-be-measured object and another parameter.

12. The computer system of claim 10, wherein the second operating system kernel layer further comprises trusted middleware comprising a trusted measurement service component, wherein the trusted measurement service component comprises a function configured to perform a fifth trusted measurement on the trusted application layer based on the root of trust, and wherein the second operating system kernel layer is further configured to perform a sixth trusted measurement on the trusted middleware based on the root of trust to produce a fifth trusted measurement result, and control the trusted middleware based on the fifth trusted measurement result.

13. The computer system of claim 9, wherein the performance core is further configured to run an operating system boot layer.

14. The computer system of claim 13, wherein the secure firmware comprises a secure firmware enable layer, a secure firmware boot layer, and a secure firmware function layer.

15. A trusted function component of a computer system, wherein the trusted function component comprises:
a baseboard management controller (BMC) chip comprising a security core,
wherein the BMC chip is configured to:
construct a root of trust in the BMC chip by running a secure firmware function layer in the security core,
perform a first trusted measurement on at least one to-be-measured object in a computing component of the computer system to produce a first trusted measurement result, and
control any one of the at least one to-be-measured object based on the first trusted measurement result,
wherein the at least one to-be-measured object comprises one or more of a configuration file of a complex programmable logic device, a first image file of a basic input/output apparatus, a second image file of an operating system kernel, a third image file of an operating system boot layer, or a fourth image file of a business application, and wherein the BMC chip comprises a performance core configured to run an operating system kernel layer and a trusted application layer;

performing, by the operating system kernel layer, a second trusted measurement on the trusted application layer based on the root of trust to produce a fourth trusted measurement result;

controlling the trusted application layer based on the fourth trusted measurement result;

receiving, by the trusted application layer, an out-of-band management signal outside the computer system; and providing at least one of an operation and maintenance service or a security service based on the out-of-band management signal.

16. A method for running a computer system, the method comprising:

running secure firmware to construct a root of trust in an out-of-band management chip;

performing a first trusted measurement on a computing component of the computer system based on the root of trust to produce a first trusted measurement result;

controlling the computing component based on the first trusted measurement result;

performing, by the computing component under a control of the out-of-band management chip, an operation indicated by the out-of-band management chip;

running, by the out-of-band management chip, an operating system kernel layer, and a trusted application layer of the computer system;

performing, by the operating system kernel layer, a second trusted measurement on the trusted application layer based on the root of trust to produce a second trusted measurement result;

controlling the trusted application layer based on the second trusted measurement result;

receiving, by the trusted application layer, an out-of-band management signal outside the computer system; and providing at least one of an operation and maintenance service or a security service based on the out-of-band management signal.

17. The method of claim 16, further comprising:

performing, by the secure firmware, a third trusted measurement on at least two to-be-measured objects in the computing component to produce a third trusted measurement result; and controlling any one of the at least two to-be-measured objects based on the third trusted measurement result, wherein the any one of at least two to-be-measured objects in the computing component comprises a first image file of a basic input/output apparatus, a second image file of a first operating system kernel, a third image file of a first operating system boot layer, and a fourth image file of a business application.

18. The method of claim 17, wherein the any one of at least two to-be-measured objects in the computing component further comprises a configuration file of a complex programmable logic device.

19. The method of claim 16, wherein the secure firmware comprises a secure firmware enable layer, a secure firmware boot layer, and a secure firmware function layer, and wherein the method further comprises:

running, by the out-of-band management chip, the secure firmware enable layer, constructing the root of trust in the out-of-band management chip;

performing, by the secure firmware enable layer, a fifth trusted measurement on the secure firmware boot layer based on the root of trust to produce a fifth trusted measurement result;

controlling the secure firmware boot layer based on the fifth trusted measurement result;

performing, by the secure firmware boot layer, a third trusted measurement on the secure firmware function layer based on the root of trust to produce a third trusted measurement result;

controlling the secure firmware function layer based on the third trusted measurement result;

performing, by the secure firmware function layer, a fourth trusted measurement on another to-be-measured object to produce a fourth trusted measurement result; and controlling the another to-be-measured object based on the fourth trusted measurement result, wherein the another to-be-measured object comprises a to-be-measured object other than the secure firmware in the computer system.

20. The method of claim 16, further comprising:

running, by the out-of-band management chip, a second operating system boot layer;

performing, by the secure firmware, a third trusted measurement on the second operating system boot layer based on the root of trust to produce a third trusted measurement result;

controlling the second operating system boot layer based on the third trusted measurement result;

performing, by the second operating system boot layer, a fourth trusted measurement on the operating system kernel layer based on the root of trust to produce a fourth trusted measurement result; and controlling the operating system kernel layer based on the fourth trusted measurement result.

* * * * *

UNITED STATES PATENT AND TRADEMARK OFFICE
CERTIFICATE OF CORRECTION

| | | |
|---|---|---|
| PATENT NO. | : 12,488,111 B2 | Page 1 of 1 |
| APPLICATION NO. | : 18/344240 | |
| DATED | : December 2, 2025 | |
| INVENTOR(S) | : Meng Shao | |

It is certified that error appears in the above-identified patent and that said Letters Patent is hereby corrected as shown below:

In the Claims

Claim 11, Column 36, Lines 18-19: "the second operating system" should read "the operating system"

Claim 12, Column 36, Lines 35-36: "the second operating system" should read "the operating system"

Signed and Sealed this
Thirteenth Day of January, 2026

John A. Squires
*Director of the United States Patent and Trademark Office*